US010167871B1

(12) United States Patent
Chen et al.

(10) Patent No.: US 10,167,871 B1
(45) Date of Patent: Jan. 1, 2019

(54) SEALLESS DOWNHOLE SYSTEM WITH MAGNETICALLY SUPPORTED ROTOR

(71) Applicant: Upwing Energy, LLC, Cerritos, CA (US)

(72) Inventors: Kuo-Chiang Chen, Kennedale, TX (US); Patrick McMullen, Villa Park, CA (US); David Biddick, Houston, TX (US)

(73) Assignee: Upwing Energy, LLC, Cerritos, CA (US)

( * ) Notice: Subject to any disclaimer, the term of this patent is extended or adjusted under 35 U.S.C. 154(b) by 0 days.

(21) Appl. No.: 15/857,472

(22) Filed: Dec. 28, 2017

Related U.S. Application Data

(60) Provisional application No. 62/561,067, filed on Sep. 20, 2017.

(51) Int. Cl.
| | | |
|---|---|---|
| *E21B 4/02* | (2006.01) | |
| *E21B 4/04* | (2006.01) | |
| *F04D 13/06* | (2006.01) | |
| *F04D 13/10* | (2006.01) | |
| *E21B 43/12* | (2006.01) | |

(52) U.S. Cl.
CPC ............ *F04D 13/0633* (2013.01); *E21B 4/02* (2013.01); *E21B 4/04* (2013.01); *E21B 43/128* (2013.01); *F04D 13/064* (2013.01); *F04D 13/10* (2013.01)

(58) Field of Classification Search
CPC ... E21B 4/003; E21B 4/02; E21B 4/04; E21B 43/128; F04D 13/0633; F04D 13/0646
See application file for complete search history.

(56) References Cited

U.S. PATENT DOCUMENTS

| 4,260,031 | A |   | 4/1981  | Jackson, Jr. |   |
|---|---|---|---|---|---|
| 5,514,924 | A | * | 5/1996  | McMullen | F16C 32/0465 |
|   |   |   |   |   | 310/90.5 |
| 6,837,621 | B1 | * | 1/2005  | Sakamoto | E21B 4/003 |
|   |   |   |   |   | 384/97 |
| 2006/0175064 | A1 | * | 8/2006  | Yuratich | E21B 43/128 |
|   |   |   |   |   | 166/381 |
| 2009/0242276 | A1 | * | 10/2009 | Hummes | E21B 4/003 |
|   |   |   |   |   | 175/57 |
| 2014/0326509 | A1 | * | 11/2014 | Hay | E21B 17/003 |
|   |   |   |   |   | 175/57 |
| 2015/0114632 | A1 |   | 4/2015  | Romer et al. |   |
| 2015/0361766 | A1 | * | 12/2015 | Downie | E21B 41/0085 |
|   |   |   |   |   | 175/41 |

FOREIGN PATENT DOCUMENTS

GB        2501352 B    11/2017

\* cited by examiner

*Primary Examiner* — Cathleen R Hutchins

(74) *Attorney, Agent, or Firm* — Fish & Richardson P.C.

(57) ABSTRACT

A rotor is surrounded by a stator. A radial bearing includes a first radial bearing portion coupled to the rotor and a second radial bearing portion coupled to the stator. A thrust-bearing includes a first portion coupled to the rotor. The first portion is spaced from a second portion coupled to the stator defining a first annular fluid gap in-between that is in fluid communication with an outside environment exterior the downhole-type machine. The thrust bearing is configured to support an axial load of the rotor within the stator.

21 Claims, 13 Drawing Sheets

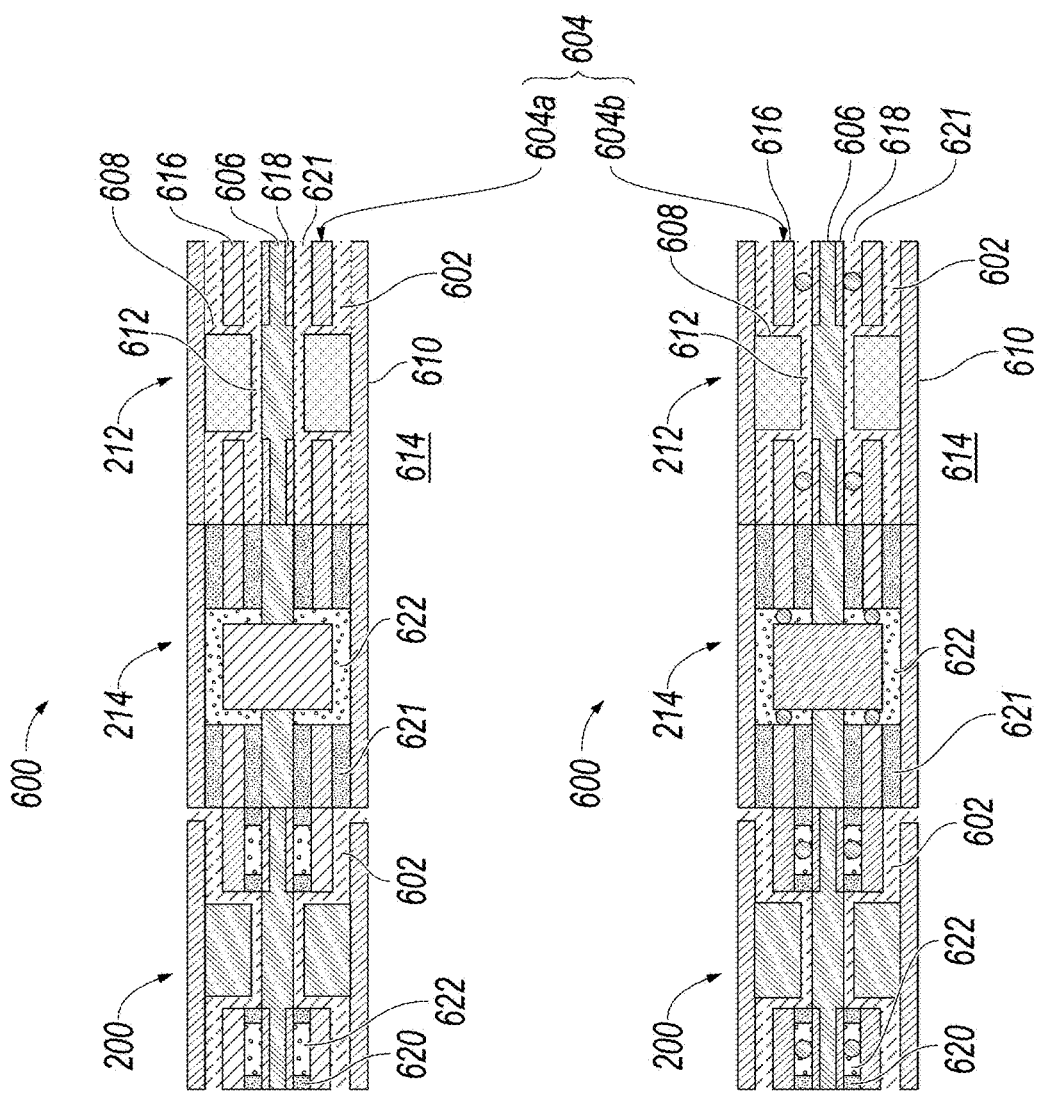

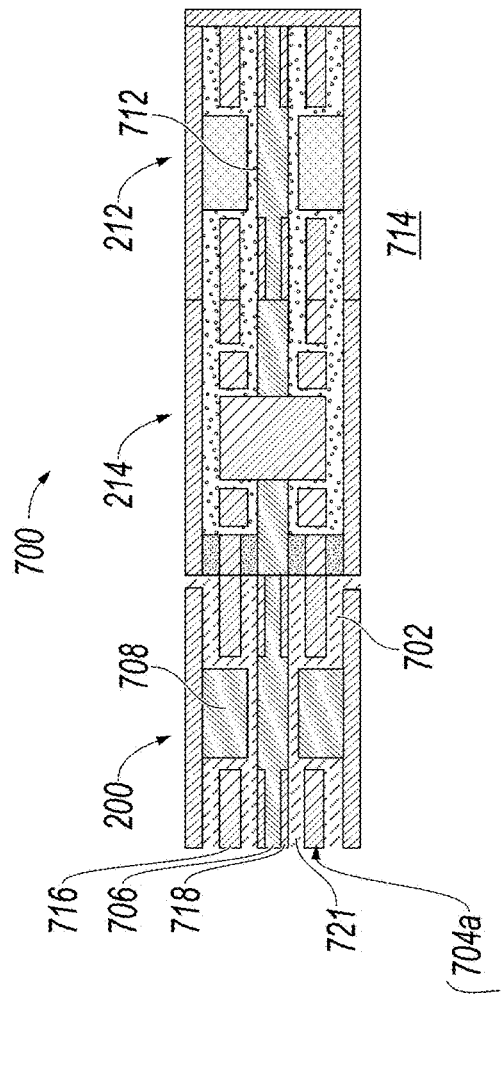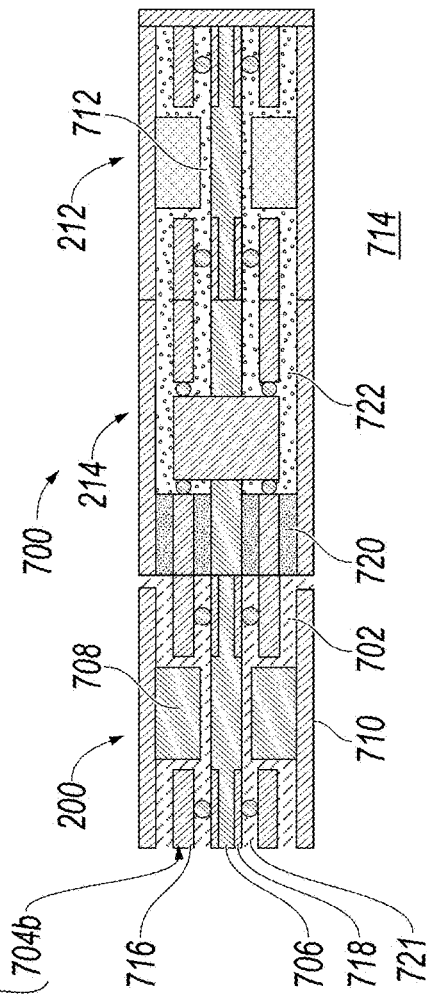
FIG. 7A
FIG. 7B

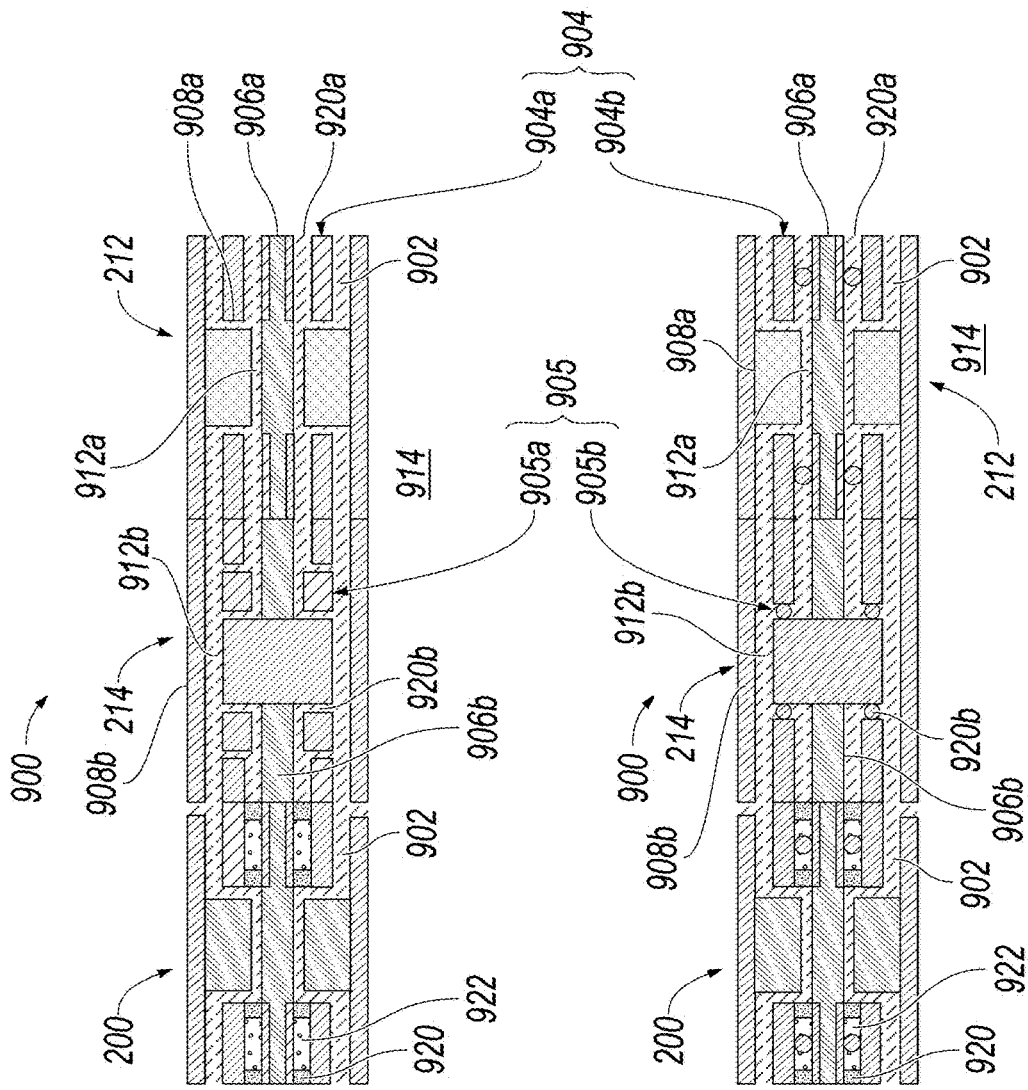

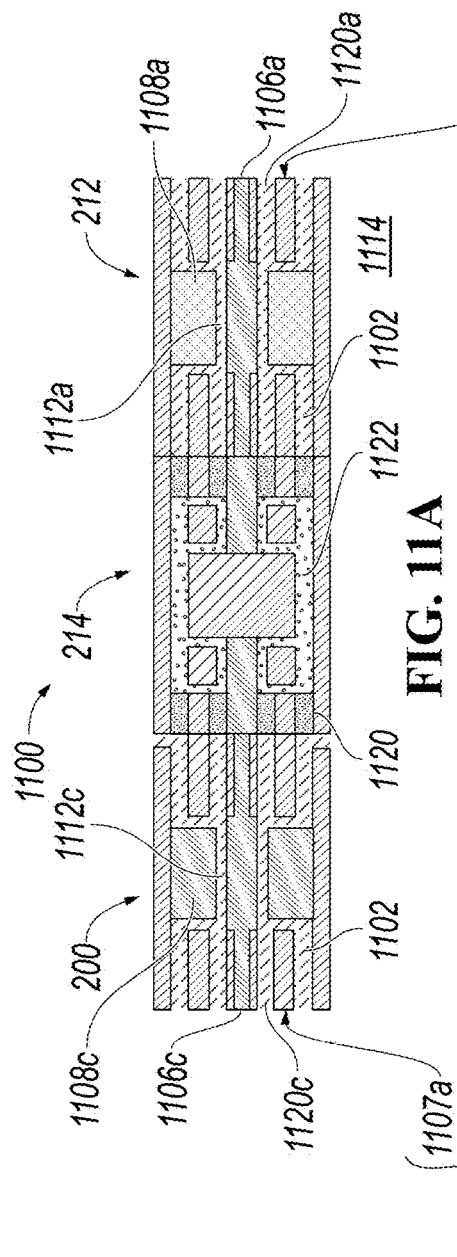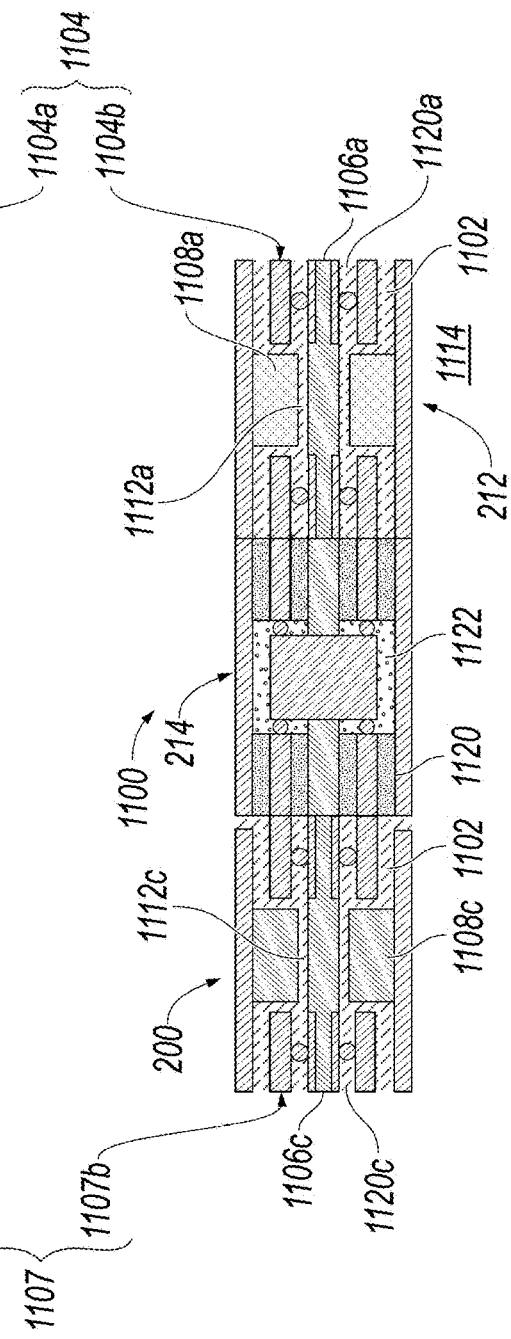

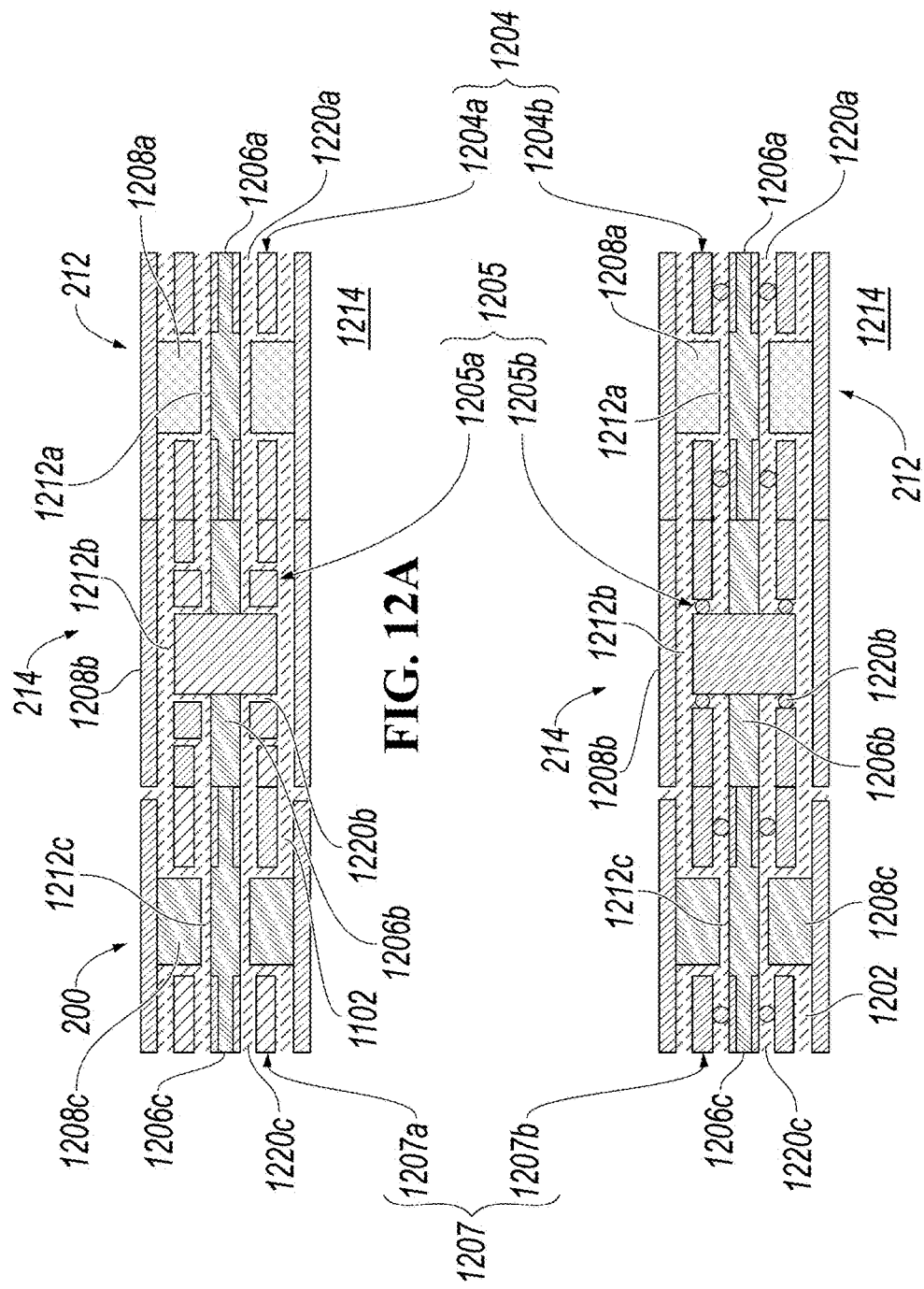

SEALLESS DOWNHOLE SYSTEM WITH MAGNETICALLY SUPPORTED ROTOR

CROSS-REFERENCE TO RELATED APPLICATIONS

This application claims the benefit under 35 U.S.C. § 119(e) of U.S. Patent Application No. 62/561,067, entitled "Sealless Downhole System with Magnetically Supported Rotor," filed Sep. 20, 2017, which is incorporated herein by reference in its entirety.

TECHNICAL FIELD

This application relates to downhole-type artificial lift systems.

BACKGROUND

Most wells behave characteristically different over time due to geophysical, physical, and chemical changes in the subterranean reservoir that feeds the well. For example, it is common for well production to decline. This decline in production can be due to declining pressures in the reservoir, and can eventually reach a point where there is not enough pressure in the reservoir to economically realize production through the well to the surface. In some instances, a top side pump or compressor is used to extend the life of the well by decreasing pressure at the top of the well. In some instance, a downhole-type artificial lift system, such as an electric submersible pump or compressor, is used to extend the life of the well by increasing pressure within the well.

SUMMARY

This disclosure describes technologies relating to sealless downhole system with a magnetically supported rotor.

An example implementation of the subject matter described within this disclosure is a downhole-type machine with the following features. A rotor is surrounded by a stator. A radial bearing includes a first radial bearing portion coupled to the rotor and a second radial bearing portion coupled to the stator. A thrust-bearing includes a first portion coupled to the rotor. The first portion is spaced from a second portion coupled to the stator defining a first annular fluid gap in-between that is in fluid communication with an outside environment exterior the downhole-type machine. The thrust bearing is configured to support an axial load of the rotor within the stator.

Aspects of the example implementation, which can be combined with the example implementation alone or in combination, include the following. The thrust bearing includes a magnetic bearing.

Aspects of the example implementation, which can be combined with the example implementation alone or in combination, include the following. The magnetic thrust-bearing includes an active magnetic thrust-bearing.

Aspects of the example implementation, which can be combined with the example implementation alone or in combination, include the following. The radial bearing includes a magnetic radial bearing.

Aspects of the example implementation, which can be combined with the example implementation alone or in combination, include the following. The magnetic radial bearing includes an active radial bearing.

Aspects of the example implementation, which can be combined with the example implementation alone or in combination, include the following. The rotor, stator and thrust bearing reside within a thrust bearing housing.

Aspects of the example implementation, which can be combined with the example implementation alone or in combination, include the following. Electrical components in the thrust bearing housing are fluidically isolated from the outside environment.

Aspects of the example implementation, which can be combined with the example implementation alone or in combination, include the following. A process fluid flow flows through the first annular fluid gap.

Aspects of the example implementation, which can be combined with the example implementation alone or in combination, include the following. The annular fluid gap is configured to cool the thrust bearing.

An example implementation of the subject matter described within this disclosure is a downhole-type artificial lift system with the following features. A fluid-end module includes a fluid rotor configured to drive or be driven by a production fluid. A fluid stator surrounds the fluid rotor. An electric machine module is rotatably coupled to the fluid end. The electric machine includes an electric rotor coupled to the fluid rotor. The electric rotor is configured to impart or receive rotational motion from the fluid rotor. An electric stator surrounds the rotor and is configured to cause the rotor to rotate or generate electricity in the electric stator when the rotor rotates. A radial bearing includes a first portion coupled to the rotor and a second portion coupled to the electric stator. A thrust bearing module includes a thrust bearing stator. A thrust bearing is configured to axially support the fluid rotor and the electric rotor. The thrust bearing stator spaced from the thrust bearing and defines a first annular fluid gap in-between that is in fluid communication with an outside environment exterior the downhole-type artificial lift system.

Aspects of the example downhole-type artificial lift system, which can be combined with the example downhole-type artificial lift system alone or in combination, include the following. The thrust bearing module comprises a magnetic thrust bearing.

Aspects of the example downhole-type artificial lift system, which can be combined with the example downhole-type artificial lift system alone or in combination, include the following. The fluid stator is spaced from the rotor and defining a fourth annular fluid gap in-between that is in fluid communication with an outside environment exterior the downhole-type artificial lift system. The fluid-end module further includes a radial magnetic bearing with a third portion coupled to the fluid rotor and a fourth portion coupled to the fluid stator. The third portion is spaced from the fourth portion defining a fourth annular fluid gap in-between that is in fluid communication with the outside environment exterior the downhole-type artificial lift system.

Aspects of the example downhole-type artificial lift system, which can be combined with the example downhole-type artificial lift system alone or in combination, include the following. The electric stator is spaced from the rotor and defining a second annular fluid gap in-between that is in fluid communication with an outside environment exterior the downhole-type artificial lift system. The radial bearing of the electric machine module includes a first portion coupled to the electric rotor and a second portion coupled to the electric stator. The first portion is spaced from the second portion defining a second annular fluid gap in-between that is in fluid communication with the outside environment exterior the downhole-type artificial lift system.

Aspects of the example downhole-type artificial lift system, which can be combined with the example downhole-type artificial lift system alone or in combination, include the following. The second annular fluid gap is in fluid communication with the first annular fluid gap.

Aspects of the example downhole-type artificial lift system, which can be combined with the example downhole-type artificial lift system alone or in combination, include the following. The fluid stator is spaced from the rotor and defining a fourth annular fluid gap in-between that is in fluid communication with an outside environment exterior the downhole-type artificial lift system. The fluid-end module further includes a radial magnetic bearing with a third portion coupled to the fluid rotor and a fourth portion coupled to the fluid stator. The third portion is spaced from the fourth portion defining a fourth annular fluid gap in-between that is in fluid communication with the outside environment exterior the downhole-type artificial lift system.

Aspects of the example downhole-type artificial lift system, which can be combined with the example downhole-type artificial lift system alone or in combination, include the following. The fourth annular fluid gap is in fluid communication with the first annular fluid gap and the second annular fluid gap.

An example implementation of the subject matter described within this disclosure is a method with the following features. A working fluid is flowed through a downhole-type rotating device positioned in a wellbore. The downhole device includes a rotor and a stator. The rotor is axially supported within the stator. The stator is spaced from the rotor and defines a first annular fluid gap in-between that is in fluid communication with an outside environment exterior the device. The working fluid is flowed through the annular fluid gap.

Aspects of the example method, which can be combined with the example method alone or in combination, include the following. The working fluid is flowed through a second annular fluid gap of a radial bearing defined by a first bearing portion coupled to the rotor and a second portion coupled to the stator. The first portion is spaced from the second portion.

Aspects of the example method, which can be combined with the example method alone or in combination, include the following. The rotor and the stator are cooled in response to flowing the working fluid through the first annular fluid gap.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 6A-6B are schematic side half cross-sectional views of an example downhole-type artificial lift system.

FIGS. 7A-7B are schematic side half cross-sectional views of an example downhole-type artificial lift system.

FIGS. 9A-9B are schematic side half cross-sectional views of an example downhole-type artificial lift system.

FIGS. 11A-11B are schematic side half cross-sectional views of an example downhole-type artificial lift system.

FIGS. 12A-12B are schematic side half cross-sectional views of an example downhole-type artificial lift system.

Like reference numbers and designations in the various drawings indicate like elements.

DETAILED DESCRIPTION

Figure 1:
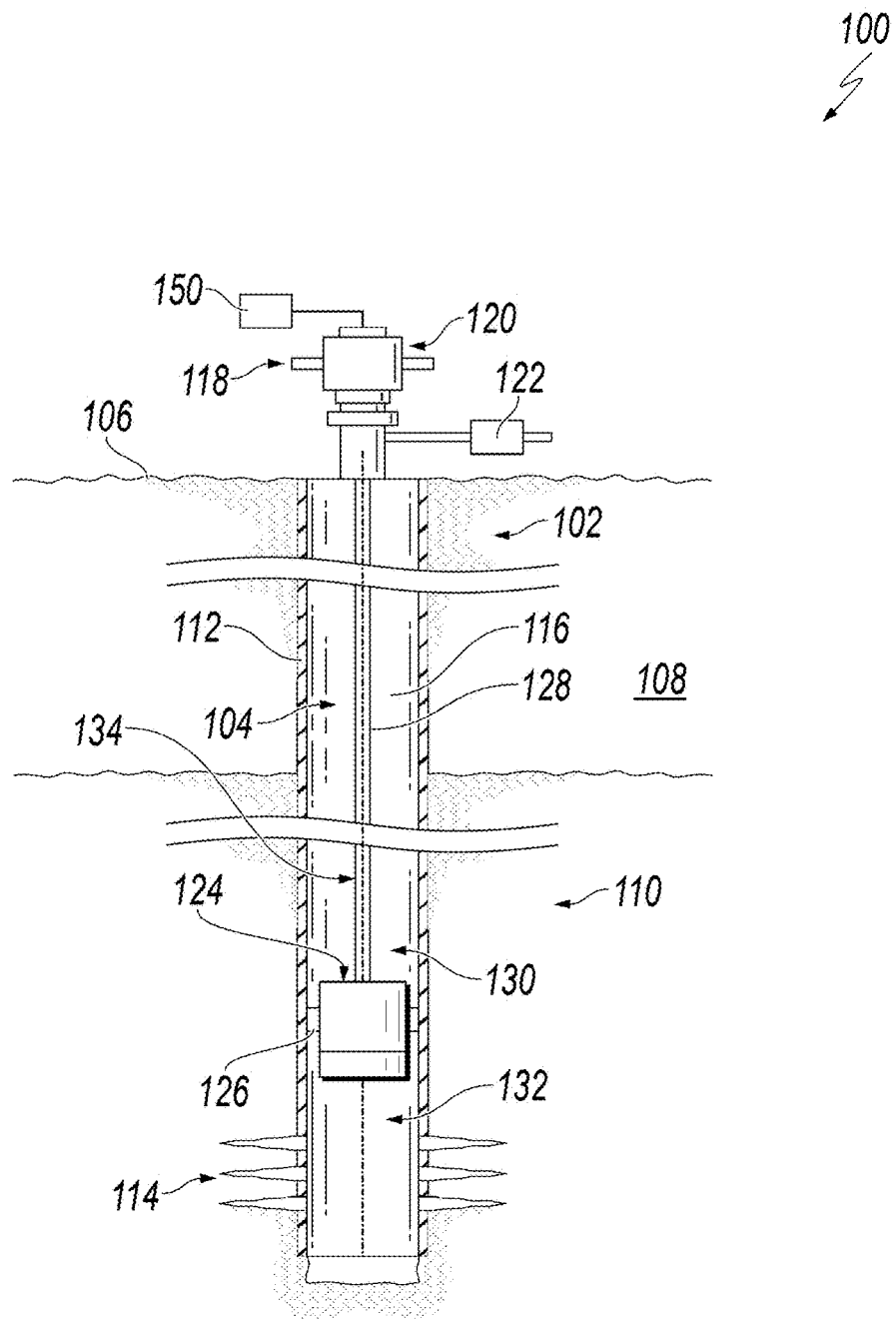
FIG. 1 is a schematic side view of an example well system including a downhole-type artificial lift system.

In the downhole environment, it is difficult to install and operate any equipment due to the caustic fluids present, pressures, temperatures, and relative distance from any supporting equipment that cannot be repackaged to fit in a small diameter tube. In addition, any installation and removal of tools in the well requires the well to be "shutdown" or "killed" to prevent fluid from flowing to the surface that can cause damage or injury, a very costly process not only in performing the work but also in lost production and risk in damaging the well where further production is jeopardized.

While all these issues and risks exist, the potential benefit of well intervention with production enhancing tools and measurement equipment is often worth the risk because of the enhanced production it can offer. While these benefits have been demonstrated, reliability and robustness of equipment in this harsh environment is not close to conventional topside mounted equipment. The concepts described herein are able to reduce the effects of a downhole environment on equipment, such as artificial lift equipment, by utilizing a magnetic bearing system for rotor support, a magnetic thrust bearing for thrust support, a high speed permanent magnet motor for torque, a sensorless long distance variable frequency drive, magnetic bearing controls, and advanced fluid compression and pump configuration. The use of the radial magnetic bearing system, thrust magnetic bearing system, and permanent magnet electric machine allow for adequate operating clearances between rotating and nonrotating parts for fluid to pass, eliminating the need for seals, barrier fluid systems or protection bag/bellow systems. Particulate material in process fluid is free to flow through the clearances. For example, particulates can be approximately 1-4 mm in size. The use of these systems can also provide operational data for the well currently unavailable, or only available with additional sensor systems. For example, the sensorless variable frequency drive can provide data on operating temperature and fluid properties through its operating requirements. In another example, an active thrust bearing can provide data on operating pressure during operation and liquid/gas content in the well. The device consists of only high temperature components to allow survival in high temperature environments present in deep wells. The device utilizes fully isolated rotor and stator parts to protect any materials and components that would be adversely affected by the process fluids. This provides the isolation necessary for allowing the process fluid to flow into and through the motor and bearings. Eliminating the need for protected or isolated areas where rotating equipment is present simplifies the design and its core elements, thus improving reliability. These isolated areas also typically use a rotating seal, like a labyrinth seal, and are flooded with a protective fluid that the equipment operates in. Over time this isolation, since it is not hermetic, is compromised by the process fluid and can impact the operation of the protected equipment. This proposed invention eliminates this type of failure as there are no rotating seals or need to isolate core rotating equipment from exposure to the process fluids.

FIG. 1 depicts an example well system 100 constructed in accordance with the concepts herein. The well system 100 includes a well 102 having a wellbore 104 that extends from the terranean surface 106 through the earth 108 to one or more subterranean zones of interest 110 (one shown). The well system 100 enables access to the subterranean zones of interest 110 to allow recovery, i.e., production of fluids to the terranean surface 106 and, in certain instances, additionally or alternatively allows fluids to be placed in the earth 108. In certain instances, the subterranean zone 110 is a formation within the Earth defining a reservoir, but in other instances, the subterranean zone 110 can be multiple formations or a portion of a formation. For simplicity, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a gas well that is used in producing natural gas from the subterranean zones of interest 110 to the terranean surface 106. While termed a "gas well," the well need not produce only dry gas, and may incidentally or in much smaller quantities, produce liquid including oil and/or water. In certain instances, the production from the well 102 can be multiphase in any ratio, and/or despite being a gas well, the well can produce mostly or entirely liquid at certain times and mostly or entirely gas at other times. For example, in certain types of wells, it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the terranean surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadingly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached the wellhead 118. The Christmas tree 120 includes valves used to regulate flow into or out of the well 102.

FIG. 1 shows a surface compressor or pump 122 residing on the terranean surface 106 and fluidly coupled to the well 102 through the Christmas tree 120. The surface compressor or pump 122 can include a variable speed or fixed speed compressor. The well system 100 also includes a downhole-type artificial lift system 124 residing in the wellbore 104, for example, at a depth that is nearer to subterranean zone 110 than the terranean surface 106. The surface compressor or pump 122 operates to draw down the pressure inside the well 102 at the terranean surface 106 to facilitate production of fluids to the terranean surface 106 and out of the well 102. The downhole downhole-type artificial lift system 124, being of a type configured in size and robust construction for installation within a well 102, assists by creating an additional pressure differential within the well 102. In particular, casing 112 is commercially produced in a number of common sizes specified by the American Petroleum Institute (the API), including 4½, 5, 5½, 6, 6⅝, 7, 7⅝, 16/8, 9⅝, 10¾, 11¾, 13⅜, 16, 116/8 and 20 inches, and the API specifies internal diameters for each casing size. The downhole downhole-type artificial lift system 124 can be configured to fit in, and (as discussed in more detail below) in certain instances, seal to the inner diameter of one of the specified API casing sizes. Of course, the downhole downhole-type artificial lift system 124 can be made to fit in and, in certain instances, seal to other sizes of casing or tubing or otherwise seal to the wall of the wellbore 104. While only one downhole-type artificial lift system 124 is shown residing in the wellbore 104, more than one may be used.

Additionally, as a downhole-type artificial lift system 124 or any other downhole system configuration such as a pump, compressor, or multi-phase fluid flow aid that can be envisioned, the construction of its components are configured to withstand the impacts, scraping, and other physical challenges the downhole-type artificial lift system 124 will encounter while being passed hundreds of feet/meters or even multiple miles/kilometers into and out of the wellbore 104. For example, the downhole-type artificial lift system 124 can be disposed in the wellbore 104 at a depth of up to 20,000 feet (6096 meters). Beyond just a rugged exterior, this encompasses having certain portions of any electronics being ruggedized to be shock resistant and remain fluid tight during such physical challenges and during operation. Additionally, the downhole downhole-type artificial lift system 124 is configured to withstand and operate for extended periods of time (e.g., multiple weeks, months or years) at the pressures and temperatures experienced in the wellbore 104, which temperatures can exceed 400° F./205° C. and pressures over 2,000 pounds per square inch/13,790 kPa, and while submerged in the well fluids (gas, water, or oil as examples). Finally, as a downhole-type artificial lift system 124, the downhole-type artificial lift system 124 can be configured to interface with one or more of the common deployment systems, such as jointed tubing (i.e., lengths of tubing joined end-to-end, threadingly and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (e.g., positioning connector 728 discussed below, which can be a jointed tubing connector, coiled tubing connector, or wireline connector). In FIG. 1, the downhole-type artificial lift system 124 is shown deployed on wireline 128.

A seal system 126 integrated or provided separately with a downhole system, as shown with the downhole-type artificial lift system 124, divides the well 102 into an uphole zone 130 above the seal system 126 and a downhole zone 132 below the seal system 126. FIG. 1 shows the downhole-type artificial lift system 124 positioned in the open volume of the bore 116 of the casing 112, and not within or a part of another string of tubing in the well 102. The wall of the wellbore 104 includes the interior wall of the casing 112 in portions of the wellbore 104 having the casing 112, and includes the open hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open hole portions of the wellbore 104. In certain instances, the seal system 126 can form a gas and liquid tight seal at the pressure differential the downhole-type artificial lift system 124 creates in the well 102. In some instances, the seal system 126 of the downhole-type artificial lift system 124 seals against the interior wall of the casing 112 or the open hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type artificial lift system 124 from a pressure in the wellbore 104 uphole of the seal system 126 of the downhole-type artificial lift system 124. Although FIG. 1 includes both the surface compressor or pump 122 and the downhole-type artificial lift system 124, in other instances, the surface compressor or pump 122 can be omitted and the downhole-type artificial lift system 124 can provide the entire pressure boost in the well 102.

In some implementations, the downhole-type artificial lift system 124 can be implemented to alter characteristics of a wellbore by a mechanical intervention at the source. Alternatively, or in addition to any of the other implementations described in this disclosure, the downhole-type artificial lift system 124 can be implemented as a high flow, low pressure rotary device for gas flow in sub-atmospheric wells. Alternatively, or in addition to any of the other implementations described in this disclosure, the downhole-type artificial lift system 124 can be implemented in a direct well-casing deployment for production through the wellbore. While the downhole-type artificial lift system 124 is described in detail as an example implementation of the downhole system, alternative implementations of the downhole system as a pump, compressor, or multiphase combination of these can be utilized in the well bore to effect increased well production.

The downhole system, as shown as the downhole downhole-type artificial lift system 124, locally alters the pressure, temperature, and/or flow rate conditions of the fluid in the wellbore 104 proximate the downhole-type artificial lift system 124 (e.g., at the base of the wellbore 104). In certain instances, the alteration performed by the downhole-type artificial lift system 124 can optimize or help in optimizing fluid flow through the wellbore 104. As described above, the downhole-type artificial lift system 124 creates a pressure differential within the well 102, for example, particularly within the wellbore 104 in which the downhole-type artificial lift system 124 resides. In some instances, a pressure at the base of the wellbore 104 is a low pressure (e.g., sub-atmospheric); so, unassisted fluid flow in the wellbore can be slow or stagnant. In these and other instances, the downhole-type artificial lift system 124 introduced to the wellbore 104 adjacent the perforations 114 can reduce the pressure in the wellbore 104 near the perforations 114 to induce greater fluid flow from the subterranean zone 110, increase a temperature of the fluid entering the downhole-type artificial lift system 124 to reduce condensation from limiting production, and increase a pressure in the wellbore 104 uphole of the downhole-type artificial lift system 124 to increase fluid flow to the terranean surface 106.

The downhole system, as shown as the downhole-type artificial lift system 124, moves the fluid at a first pressure downhole of the blower to a second, higher pressure uphole of the downhole-type artificial lift system 124. The downhole-type artificial lift system 124 can operate at and maintain a pressure ratio across the downhole-type artificial lift system 124 between the second, higher uphole pressure and the first, downhole pressure in the wellbore. The pressure ratio of the second pressure to the first pressure can also vary, for example, based on an operating speed of the downhole-type artificial lift system 124, as described in more detail below. In some instances, the pressure ratio across the downhole-type artificial lift system 124 is less than 2:1, where a pressure of the fluid uphole of the downhole-type artificial lift system 124 (i.e., the second, higher pressure) is at or below twice the pressure of the fluid downhole of the downhole-type artificial lift system 124 (i.e., the first pressure). For example, the pressure ratio across the downhole-type artificial lift system 124 can be about 1.125:1, 1.5:1, 1.75:1, 2:1, or another pressure ratio between 1:1 and 2:1. In certain instances, the downhole-type artificial lift system 124 is configured to operate at a pressure ratio of greater than 2:1.

The downhole system, as shown as the downhole-type artificial lift system 124, can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The downhole-type artificial lift system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric, where the pressure in the wellbore 104 is above about 14.7 pounds per square inch absolute (psia), or about 101.3 kiloPascal (kPa). The downhole-type artificial lift system 124 can operate in above atmospheric wellbore pressures, for example, at wellbore pressure between 14.7 psia (101.3 kPa) and 5,000 psia (34,474 kPa).

An amplifier drive and magnetic bearing controller 150 for a downhole system, shown as the downhole-type artificial lift system 124, is in some implementations, located topside to maximize reliability and serviceability. A digital signal processor (DSP) based controller receives the position signals from sensor and/or sensor electronics within the downhole-type artificial lift system 124 and uses this for input as part of its position control algorithm. This algorithm output is a current command to an amplifier to drive coils of the active magnetic bearings within the downhole-type artificial lift system 124, thus impacting a force on the rotor (details are explained in greater detail later within the disclosure). This loop typically happens very fast, on the order of 1,000-20,000 times a second depending on the system control requirements. This control system is also capable of interpreting the bearing requirements to estimate forces and fluid pressures in the well. An analog circuit based controller can also perform this function. Having this DSP or analog circuit based controller topside allows for easy communication, service, improved up time for the system, as any issues can be resolved immediately via local or remote support. Downhole electronics are also an option either proximate to the device or at a location more thermally suitable. In a downhole implementation, the electronics are packaged to isolate them from direct contact with the downhole environment. Downhole electronics offer potentially better control options since they don't suffer with long cable delay and response issues.

Figure 2:
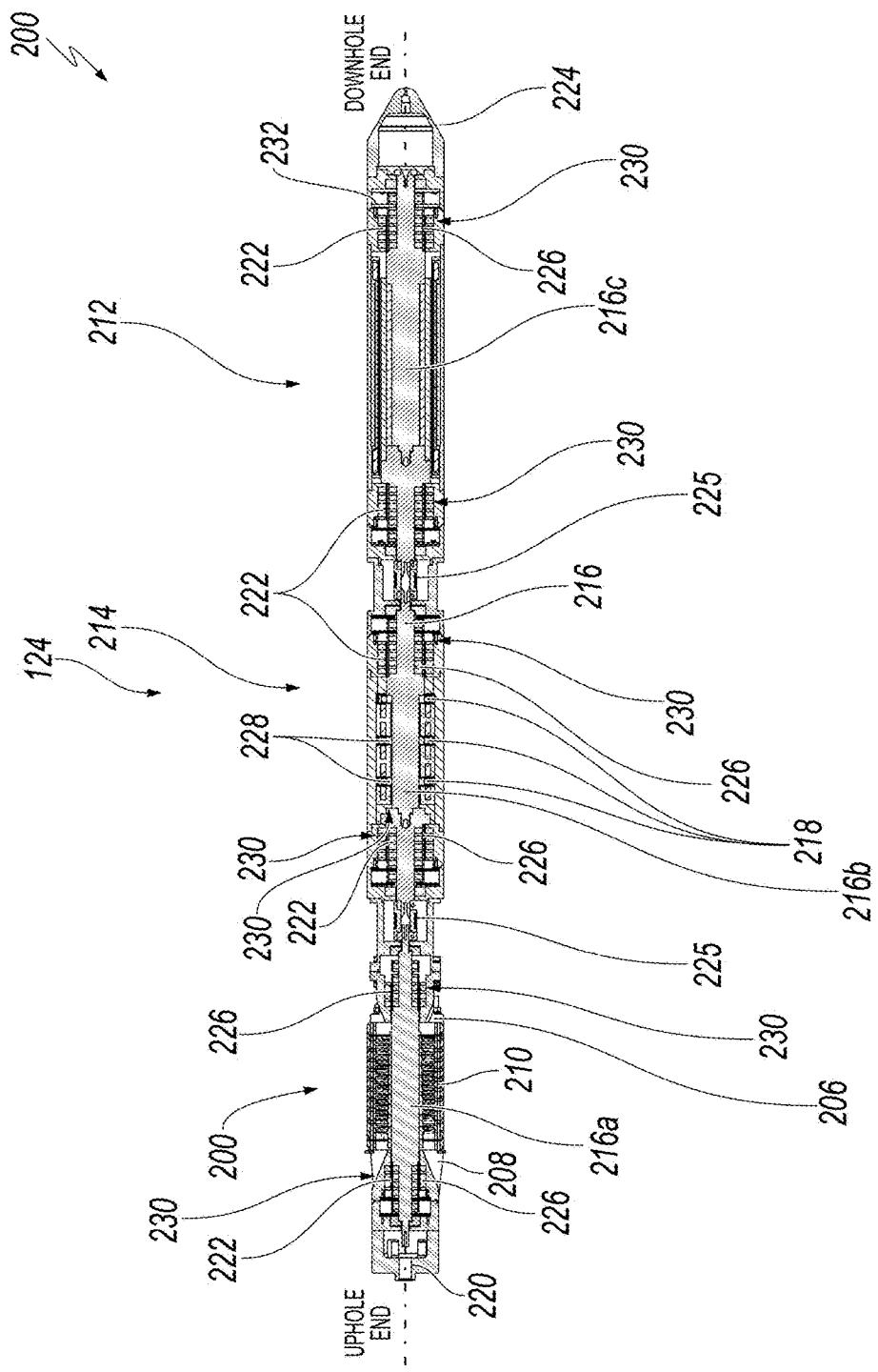
FIG. 2 is a schematic side half cross-sectional view of an example downhole-type artificial lift system.

FIG. 2 is a half side cross-sectional view of the example downhole-type artificial lift system 124. Referring to both FIGS. 1 and 2, the example downhole-type artificial lift system 124 includes a fluid-end 200 and an electric machine 212. In the context of this disclosure, an uphole end or direction is an end nearer to or moving in a direction towards, respectively, the terranean surface 106. A downhole end or direction is an end nearer to or moving in a direction away from, respectively, the terranean surface 106. A coupling 220 is positioned at an uphole end of the fluid-end 200. The coupling can be of a type used for a wireline connection, a tubing connection, a production tubing or any other connection configured to support the weight of the downhole-type artificial lift system. The coupling 220 can include a standard attachment method to attach the downhole-type artificial lift system to a support system. For example, a threaded interface can be used for sucker rod, or a set of bolts can be used to attach two flanges together for production tubing. The fluid-end 200 includes an inlet 206 to receive a gas at the first pressure downhole of the fluid-end 200 and an outlet 208 to output the gas at the second, higher pressure uphole of the fluid-end 200. The inlet 206 can include a filter to limit particle sizes above a certain threshold from entering the downhole-type artificial lift system 124, or such a filter can be located downhole of the conical tip 224. A cylindrical outer housing 210 houses an impeller (described later) in fluid communication with the inlet 206 to receive a production fluid from the wellbore 104 at the first pressure downhole of the fluid-end 200 and to drive the production fluid to the outlet 208 at the second, higher pressure uphole of the fluid-end 200. The inlet 206 includes a series of holes evenly spaced around the circumference of the housing 210 and oriented in a downhole trajectory. The outlet 208 includes a series of holes evenly spaced around the circumference of the housing 210 and oriented in an uphole trajectory. With the downhole-type artificial lift system 124 residing in the wellbore 104, the inlet 206 is at a downhole end of the fluid-end 200 and the outlet 208 is at an uphole end of the fluid-end 200. At a downhole end of the downhole-type artificial lift system 124 is a conical tip 224. The conical tip 224 smoothly directs the flow over the electric machine 212. In some implementations, the conical tip 224 can house electronics that can be used in aspects of operation of the downhole-type artificial lift system 124 or for sensors. In some instances, the downhole-type artificial lift system 124 can be positioned in the well with the downhole inlet 206 positioned adjacent to the perforations 114 in the wellbore 104. For example, the fluid-end 200 can be positioned in the wellbore 104 such that the inlet 206 is disposed next to and immediately uphole of the perforations 114 to maximize or improve the fluid flow from the perforations into the fluid-end 200. In some examples, the inlet 206 may not be adjacent to perforations 114, such as the inlet 206 being positioned greater than about twenty feet away from the perforations 114. In some instances, a speed of the fluid-end 200 is adjusted based on the fluid flow from the subterranean zone into the wellbore 104 (e.g., via perforations 114). For example, as the fluid flow from the subterranean zone into the wellbore 104 decreases, a speed of the fluid-end 200 can increase to draw more fluid flow from the subterranean zone into the wellbore 104.

As previously described, the downhole-type artificial lift system 124 moves the fluid from the downhole inlet 206 at the first pressure to the uphole outlet 208 at the second, higher pressure. This pressure differential promotes the fluid flow to move uphole of the downhole-type artificial lift system 124, for example, at a higher flow rate compared to a flow rate in a wellbore without a downhole-type artificial lift system. The fluid-end 200 can operate at a variety of speeds, for example, where operating at higher speeds increases fluid flow, and operating a lower speeds reduces fluid flow. In some instances, the impeller of the fluid-end 200 can operate at speeds up to 120,000 revolutions per minute (rpm). In some instances, the impeller of the fluid-end 200 can be run at lower speeds (e.g., 40,000 rpm, or other). For the downhole-type artificial lift system 124 illustrated, the maximum operating speed is 60,000 rpm. Specific operating speeds for the downhole system are defined based on the fluid, pressures and flows for the well parameters and desired performance. In some instances, speeds of the downhole system may be as low as 6,000 rpm or as high as 120,000 rpm. While the downhole system has an optimal speed range at which it is most efficient, this does not prevent the downhole system from running at less efficient speeds to achieve a desired flow for a particular well, as well characteristics change over time.

FIG. 2 further illustrates an electric machine 212 and a thrust bearing module 214. The electric machine 212, the thrust bearing module 214, and the fluid-end 200 are all coupled together on a central shaft 216. The electric machine 212 is configured to rotatably drive or be driven to generate electricity by the fluid-end 200. The central shaft 216 is levitated and axially supported by one or more active magnetic thrust bearing assemblies 218 located in the thrust bearing module 214. One or more passive magnetic radial bearing assemblies 222 radially levitate and support the central shaft 216. While one of each electric machine 212, thrust bearing module 214, and fluid-end 200 modules are shown, more than one of each or all are practical in this configuration, thus allowing for additional motor power, additional thrust load support, and additional flow or pressure capacity to be added independently of each other to best produce the specific well performance. In addition, while the order of electric machine 212, thrust bearing module 214, and fluid-end 200 module from downhole to uphole is shown, each module functions independently and can be placed in other orders that best suit the operation and integration of each module. Additionally, while a fluid-end 200 is shown, this can include a blower, a compressor, a liquid pump, a multiphase pump, or a combination thereof that best suits the fluids and conditions of the well to maximize well performance. In addition, the use of passive magnetic radial bearing assemblies 222 and active magnetic thrust bearing assemblies 218 can be seen as one example of such an implementation of magnetic bearings, where active radial bearings and/or passive thrust bearings can be used instead of or in addition to, in any case to enhance the downhole system performance.

The passive magnetic bearing assemblies 222 include permanent magnets on the central shaft 216 and the outer casing 210. The magnets on the central shaft 216 are configured to repel the magnets on the outer casing 210 allowing the shaft to be levitated and supported by the magnets. The passive magnetic radial bearings do not include any electronic circuitry capable of actively altering the magnetic field to affect the supporting characteristics of the bearings. That is, an external power source is not needed to power the radial passive magnetic bearings. Both stator magnets and rotor magnets are canned or otherwise isolated to prevent process fluids from reaching the magnets and degrading performance. In some implementations, damping for the passive system, which can be either radial or axial, or both, is provided by solid plates or tubes with high electrical conductivity, such as copper or aluminum.

In some implementations, an active damping circuit 232 can be included with the passive radial bearing 222. The active damping circuit 232 uses a coil to sense rotor radial motion and provide a current in size and frequency relative to this motion to a control board. The control board amplifies this signal and adjusts the relative polarity/phase to feed it back to a damping coil that reacts against the rotor field to resist the motion, thus damping out the motion. No radial position sensors or controller is required for the passive radial bearing operation. The active damping circuit 232 is able to adjust the magnetic field sufficiently enough to reduce vibration, but does not have the power to significantly affect the lifting or support characteristics of the bearing. In some implementations, the active damping circuit 232 acts as a generator that generates power when the axial gap decreases and thus powers a control coil to increase the levitating force. Thus, it doesn't need a sensor or an outside power source/controller. This approach can also be used for the axial axis, where a sense coil output sensing axial motion is amplified and fed to a damping to coil to react against the rotor field to resist motion. In some instances, the active damping circuit 232 can include the active damping circuit described in U.S. patent application Ser. No. 15/392,258.

The active magnetic thrust bearing assembly 218 and the passive magnetic radial bearing assembly 222 fully support the central shaft 216 with one or more electromagnetic fields. That is, the central shaft 216 is not physically coupled the outer housing 210 during normal operation; there is no physical connection between the central shaft 216 and the outer housing 210. In other words, the shaft is spaced apart from the housing 210 and any associated mechanism connected to the housing 210 with a radial gap between the central shaft 216 and the housing 210.

In the illustrated implementation, the electric machine 212 is positioned downhole of the fluid-end 200. The illustrated implementation also shows the active thrust bearing assembly resides between the electric machine and the blower. In some instances, the fluid-end 200, the thrust bearing module 214, and the electric machine 212 can be assembled in a different order. For example, the thrust bearing module 214 can be positioned downhole of the electric machine 212 or uphole of the fluid-end 200.

In FIG. 2, the central shaft 216 comprises multiple sub-sections coupled together: a fluid rotor 216a, a thrust bearing rotor 216b, and an electric rotor 216c. Each sub-section is joined together by a coupling 225. The coupling 225 can be a bellows, quill, diaphragm, or other coupling type that provides axial stiffness and radial compliance. In certain instances, the coupling 225 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. In some implementations, the central shaft 216 can include a single, unitary shaft that runs through the fluid-end 200, the thrust bearing module 214, and the electric machine 212.

The use of magnetic bearings allows for a sealless design. That is, the surface of the fluid rotor 216a, the thrust bearing rotor 216b, and the electric rotor 216c need not be sealed from and can all be exposed to the production fluid. As no mechanical bearings are used in the downhole-blower system, no lubrication is needed. As there is no lubrication or mechanical parts that have contamination concerns, no seals are needed for such components. Sensitive electronic and magnetic components can be "canned" or otherwise isolated from the downhole environment without affecting their electromagnetic characteristics. Details on "canning" are discussed later within this disclosure. There is a common fluid path through the passive magnetic radial bearing assemblies 222 and the active magnetic thrust bearing assemblies 218 that allow fluid to flow through an "air-gap" 226 in each of the bearings. More specifically, the active magnetic thrust bearing assemblies 218 have gaps 228 between a bearing housing 230 and the central shaft 216. The gap is unsealed and is of sufficient size to allow fluid flow through the active magnetic thrust bearing assembly 218. The passive magnetic radial bearing assemblies 222 include one or more gaps 226 between a bearing housing 230 and the central shaft 216. The radial bearing gaps 226 and the thrust bearing gaps 228 are sufficiently large to allow particulates to pass through without causing damage to rotating or stationary components. For example, in the illustrated implementation, an air-gap between the central shaft 216 (e.g., permanent magnet rotor 216c) and a stator of the electric machine 212 receives the fluid during operation of the downhole-type artificial lift system 124. That is, an air-gap between the permanent magnet rotor 216c and the electric stator of the electric machine receives the fluid during operation of the electric machine. The bearings do not require seals as there is no physical contact between the rotor 216 and the outer case 210. In other words, the central shaft 216 is spaced apart from the outer housing 210 and is not mechanically connected to the outer housing 210.

Figure 3:
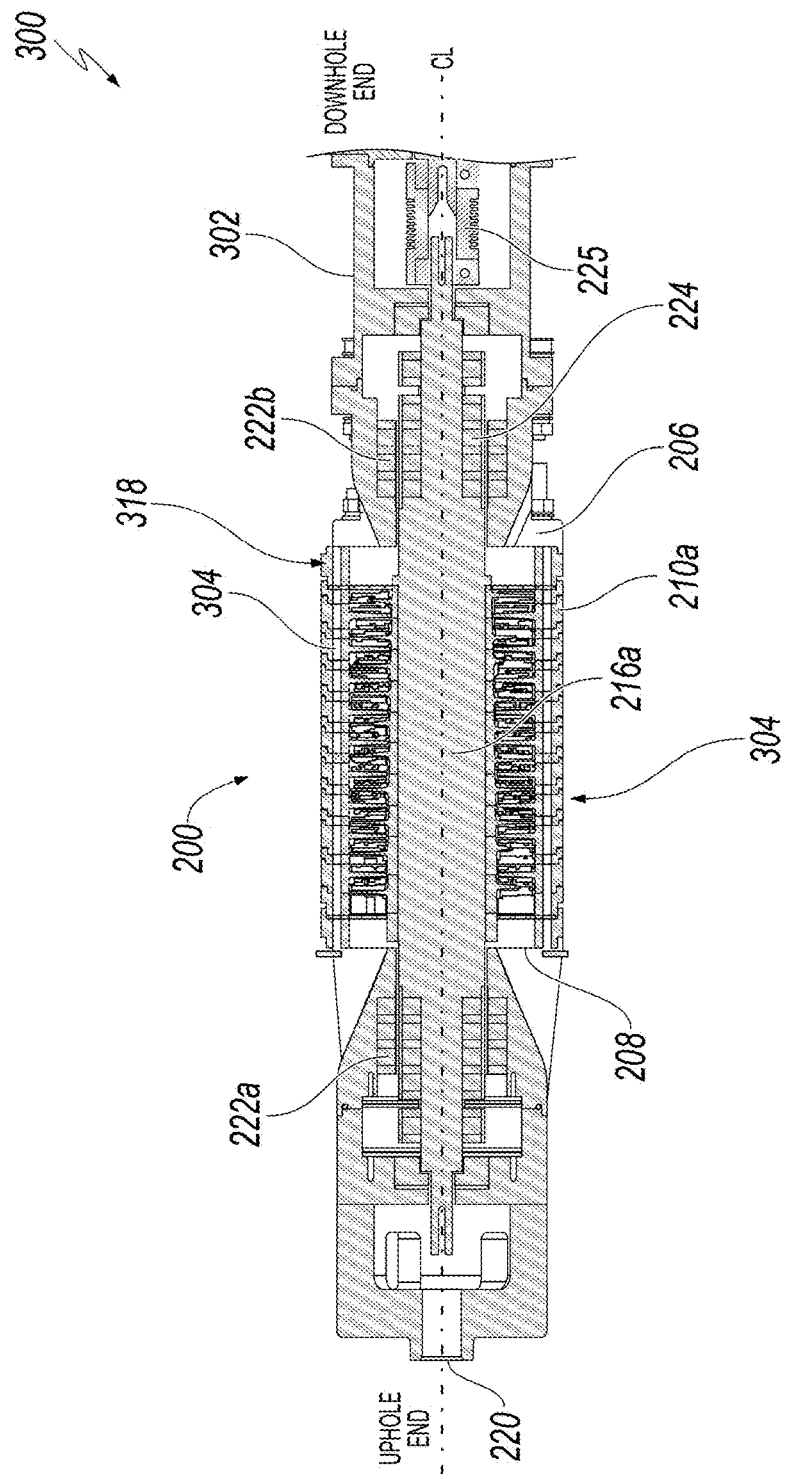
FIG. 3 is a schematic side half cross-sectional view of an example fluid-end module.

FIG. 3 is a detailed, half cross-sectional view of the fluid-end 200. The fluid-end 200 can also be configured to move liquid and act as a pump, move gas and act as a blower/compressor, or any combination of liquid and gas. In the illustrated implementation, the fluid-end 200 is coupled to an uphole end of the thrust bearing module 214 by the coupling 225 and a coupling housing 302. The fluid rotor 216a is axially supported and levitated by the thrust bearing module (not shown). In the illustrated implementation, a first passive magnetic radial bearing 222a supports a first end of the fluid rotor 216a relative to a concentrically surrounding fluid stator 210a. The first passive magnetic radial bearing 222a radially levitates and supports a first end of the fluid rotor 216a. In some implementations, a second passive magnetic radial bearing 222b is used to support a second end of the fluid rotor 216a relative to the surrounding pump stator 210a. The second passive magnetic radial bearing 222b radially levitates and supports a second end of the fluid rotor 216a.

In some implementations, such as the implementation shown in FIG. 3, the fluid-end 200 includes a fluid rotor 216a and a fluid stator 216a. The fluid rotor 216a, as illustrated, is an axial fan with blades radiating out from a central axis. The blades are configured to drive or be driven by a production fluid in the wellbore. The fluid stator 210a includes stator vanes radiating in towards a center axis. The stator vanes are configured to direct fluid flow to increase the efficiency of the fluid-end 200. The rotor vanes and the stator vanes interface without contacting one another while the fluid rotor 216a is rotating. As illustrated, the fluid-end 200 includes a segmented fluid stator 210a that includes multiple axially stacked, assembled together segments 304, stacked against one another. The stacked-stator implementation has several benefits, particularly during assembly. Assembling stacked stator segments 304 one piece at a time allows the rotor to be completed independent of the stator, where the stator stages are then built around the rotor for a simplified and lower cost build process. Any adjustment for alignment can be determined as the stages are stacked via shims to ensure the unit is aligned with rotor to stator blade clearances for optimal performance.

In FIG. 3, each stator segment 304 is configured to stack against one another with a stator segment shoulder that centers each stator segment 304 once stacked. The stator segments 304 are held together by one or more stator bolts 304. Each stator segment has one or more bolt holes 318 near the outer edge of the stator segment that allows the stator bolt 304 to pass though the stator segment 304. In FIG. 3, the stacked stator segments 304 can define the outer housing 210 of the fluid-end 200.

In some implementations, the fluid rotor 216a can also include multiple rotor segments that are designed to stack against one another. In some implementations, the fluid rotor 216a can include a central portion that is configured to retain blades. In some implementations, torque can be transferred to or from the fluid rotor 216a through the coupling 225. The coupling 225 can be a bellows, quill, diaphragm, or other coupling type that provides axial stiffness and radial compliance. In certain instances, the coupling 225 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. Larger and smaller alignment tolerances can be achieved with different coupling configurations and sizes, specific to the application needs. The coupling 225 transmits torque and axial forces and movement from one shaft to the other while allowing for radial misalignment between the shafts and for dynamic isolation between shafts, i.e. the respondent frequency of each shaft is much higher as shorter pieces, as opposed to one long shaft. Such axial movement may be experienced due to thermal growth during operation. As illustrated, the coupling 225 connects the downhole end of the fluid rotor 216a to an uphole end of the thrust bearing module 214.

Figure 4A:
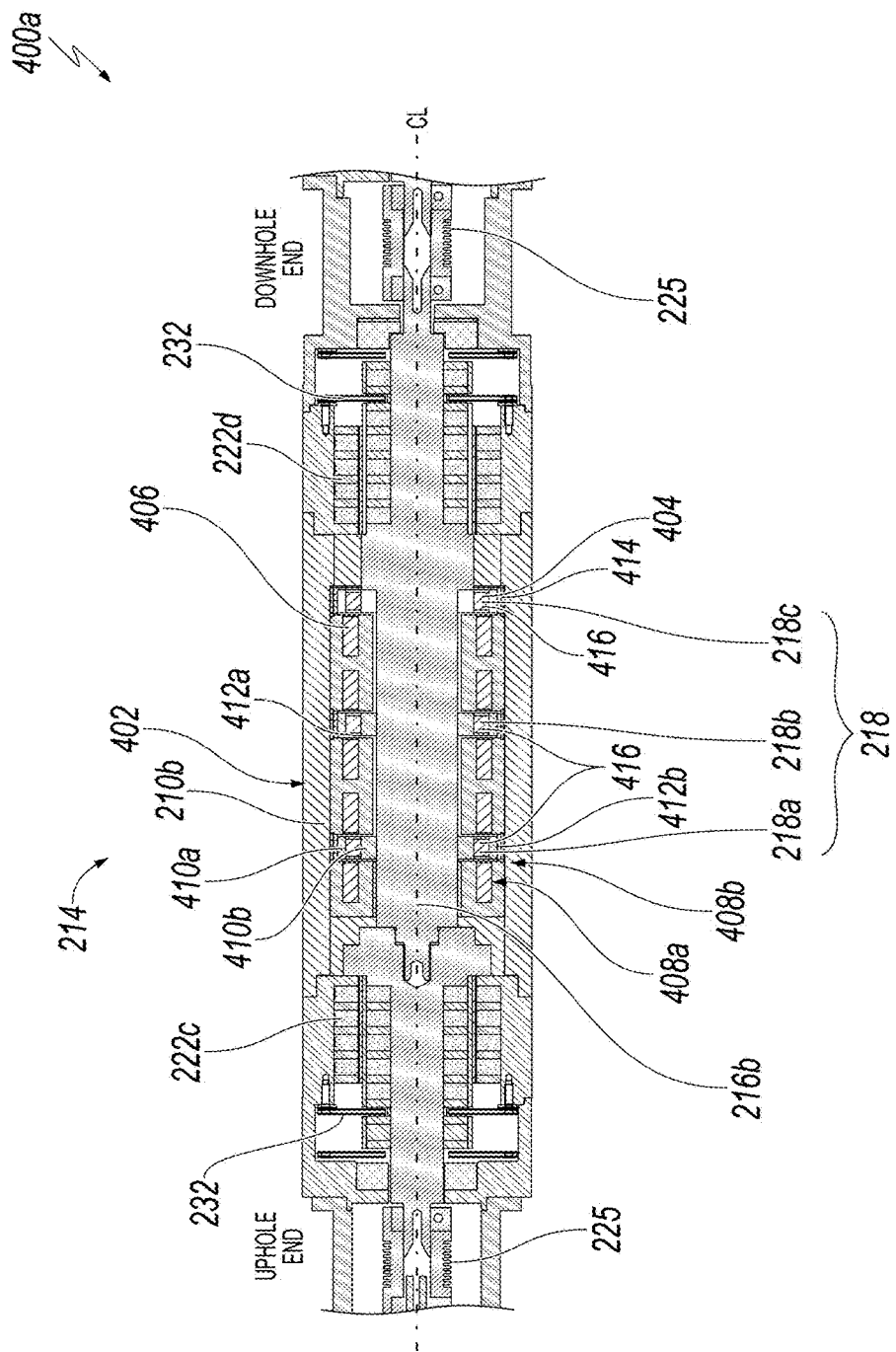
FIG. 4A is a schematic side half cross-sectional view of an example thrust bearing module.

FIG. 4A is a side cross-sectional view of an example thrust bearing module 214. The thrust bearing module 214 includes one or more active magnetic thrust bearings 218 supporting a central rotor 216 (bearing rotor 216b) to a surrounding stator 210b. The active magnetic thrust bearing 218 is configured to levitate and support a central rotor 216 axially within an outer housing 210 (surrounding stator 210b). Passive radial bearings 222c and 222d are configured to levitate and support a central rotor 216 radially within an outer housing 210. An active damping circuit 232 is included and is configured to damp radial vibration within the central rotor. Axial vibrations are mitigated with the active magnetic thrust bearings 218, or with an additional axial damping circuit (not shown).

In some instances, position sensors are required for an active magnetic bearing, such as for the thrust bearings 218, and can use conventional inductive, eddy current, or other types of sensors. These sensors must be isolated from the environment to ensure operation over the time downhole. With conventional sensors, electronics could be installed downhole in the device or at a topside facility with sensor downhole. Position sensors can be located within the thrust bearing module 214, or in the fluid end 200, or in any location that is intended to be the central point of axial position control.

The position sensors can include a position sensitive generator, such as an axial gap generator, that can produce a voltage proportional to the axial gap that can be used to determine axial position. This offers a high voltage output that can be transmitted over long distances to minimize line drop and noise issues. Multiple approaches can be used to achieve a sensor downhole for the thrust bearing system, but all are unique in how they are integrated into the system to meet the operating environment.

The thrust bearing module 214 compensates for any axial loads and holds the axial position of the multiple module rotors by applying force to the rotor to maintain position. As loads are developed from the act of compressing or pumping fluids, the thrust bearing controller 150 senses position movement of the rotor from a target set point. The controller 150 then increases the current to the coil 406 that is converted to force on the rotor. This force is determined based on the amount of displacement sensed and the rate of change in motion using the specific control approach set by the controller 150. The thrust bearing 218 with controller 150 is thus able to compensate for forces on the rotor and apply corresponding off-setting forces to keep the rotor in an axial centered position. While a permanent magnet on the rotor configuration is shown, various configuration of thrust bearing could be applied, including all electric or alternative permanent magnet configurations.

As illustrated, the thrust bearing module 214 allows for non-magnetic spacers 414 to be used at the rotor outer diameter for setting stator axial position and for locking the split stator assemblies 402. Opposite polarity permanent magnets 404 are used on the rotor 216b to allow for coil wrapping of one or more back-to-back stator "C" shaped cores 406 to reduce overall bearing size and make assembly possible in split stator halves (i.e. both use the same coil). The outer housing, limited by the well installation casing size and flow path requirements, limits thrust bearing outer diameter, where the rotor outer diameter is further limited by the stator spacer and adequate clearance for rotor radial motion during operation and transport, and radial rotor growth due to high speed operation. In the illustrated implementation, the stator poles 408a are radially offset from the rotor poles 410a and 410b. With the restricted rotor outer diameter limiting the rotor pole size, the stator pole offset increases the cross section of the stator poles 408a, which increases the capacity of the thrust bearing 218, increasing bearing capacity without increasing overall bearing size.

Figure 4B:
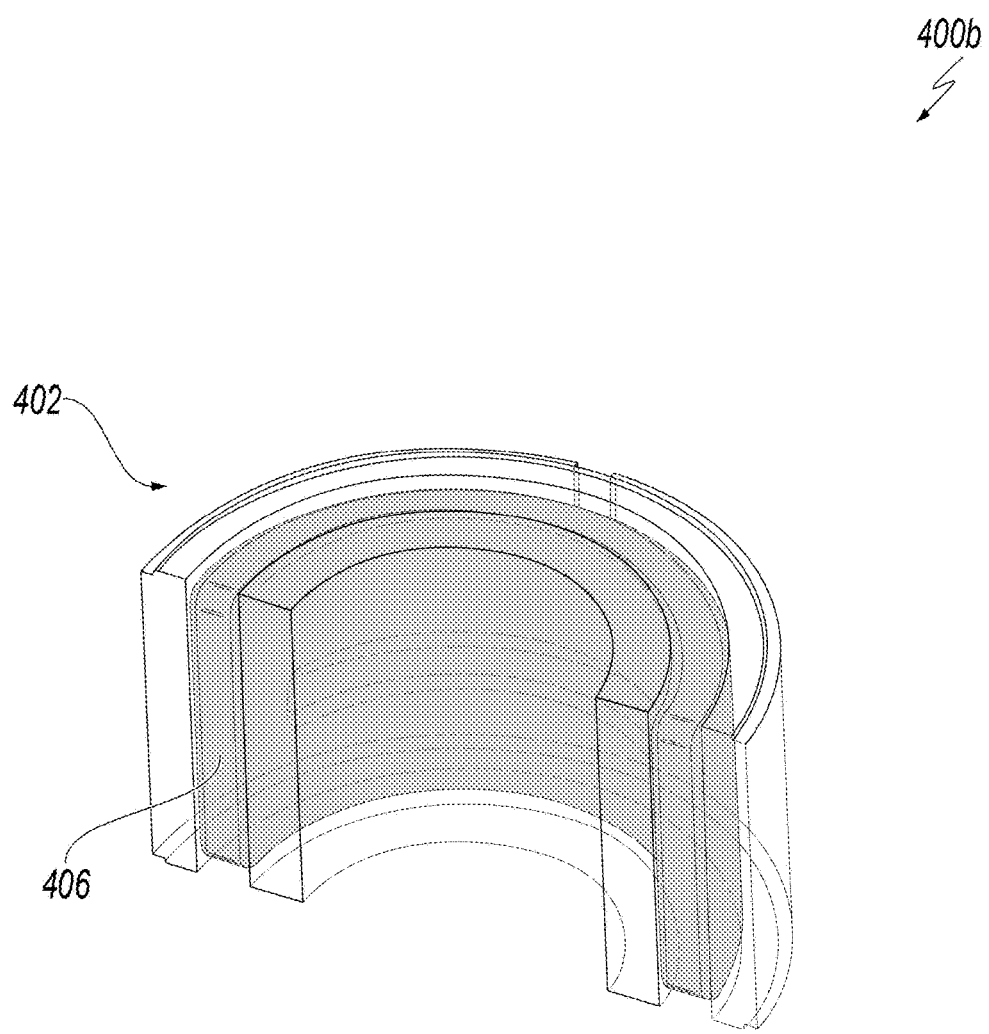
FIG. 4B is a perspective cut-away view of an example half stator pole.

Illustrated in FIG. 4B is an example "C" shaped core 406 used in the stator 402. The polarity for these coils 406 as it applies to each opposite pole face is opposite of one another. Each back to back "C" shaped core 406 allows the split stator 402 to be split in half to form two 180 degree assemblies. The split stators 402 fit together and define an annulus between the stators 402 and an outer diameter of the rotor 216b. The coils 406 in each of these 180 degree assemblies are wrapped from one side to the other, and results in opposite coil polarity on each side of the "C"

shaped core 406. This in conjunction with the permanent magnets 416 on the rotor 216*b* having opposite polarity to the adjacent magnet works to minimize size and simplify integration (coils that are split do not need to be routed to the outer diameter where they take up additional room and do not aid in generating bearing force). A third passive magnetic radial bearing 222*c* supports and levitates the bearing rotor 216*b* within the bearing stator 210*b*. A fourth passive magnetic radial bearing 222*d* supports and levitates the bearing rotor 216*b* within the bearing stator 210*b*.

The illustrated implementation (FIG. 4A) shows a three bearing module with a first thrust bearing 218*a*, a second thrust bearing 218*b*, and a third thrust bearing 218*c*. The stator pole on the third thrust bearing 218*c* is missing in the arrangement shown, where this is to be the downhole side of the module. Since the thrust load is generally in a downhole direction as the system pushes fluid uphole, this arrangement of leaving the bottom stator pole provides a passive force in the uphole direction. That is, with no current, the module will lift the rotor 216*b* (and anything coupled to the rotor 216*b*) in an uphole direction. Further lift can be imparted on the rotor with coil current in one direction, and lift can be reduced with coil current in the opposite direction. The number of thrust bearings in a module can be one or more, depending on size, integration, rotodynamics, and other design considerations.

The bearing module 214 includes a rotor outer pole 410*a*. The rotor outer pole 410*a* is a magnetic steel pole that is magnetically acted upon by the stator pole 408*a* to produce force on the rotor 216*b*. The rotor outer pole 410*a* acts to conduct a permanent magnet field and a coil generated magnetic field and acts as the primary containment of the permanent magnet 416 onto the rotor for high speed operation. In some implementations the rotor outer pole 410*a* is secured with an interference fit on an inner diameter of the rotor outer pole 410*a* to the permanent magnet ring 416.

A rotor inner pole 410*b* is a magnetic steel pole that is magnetically acted upon by the stator pole 408*a* to produce force on the rotor 216*b*. The rotor inner pole 410*b* acts to conduct the permanent magnet field and the coil generated magnetic field. The rotor inner pole 410*b* is the primary connection point to the shaft 216 (rotor 216*b*) with which the thrust bearing forces are applied to the shaft 216.

A radially magnetized permanent magnet ring 416 is a permanent magnet material that provides magnetic field that the thrust bearing 218 uses to distribute to stator poles 408*a* on each side of the rotor 216*b*, thus energizing each gap between rotor pole and stator pole. The permanent magnet field provides roughly half of the maximum field designed for the stator poles 408*a* and rotor poles 408*b*, where this level allows for linear current load response from the bearing. The permanent magnet ring 404 is radially magnetized to provide a uniform polarity field to the outer poles and inner poles. With the use of multiple thrust bearings 218, the polarity of these rotor permanent magnets 404 changes from one to the next to allow for opposite coil polarity in double stator poles.

A rotor seal can 412*a* is a ring that covers the permanent magnet 404 sides and is welded or otherwise sealed to the metal outer and inner poles to prevent process fluids from contacting the permanent magnet and degrading performance. The cans 412*a* can be metallic, and nonmagnetic, but could also be made of a non-metallic material, such as Peek or ceramic.

A thrust bearing stator pole 408*a* is a stator pole that includes a magnetic steel material that conducts the permanent magnet flux and electromagnet coil flux for energizing the pole air gaps that result in forces on the rotor 216*b*. The thrust bearing stator poles 408*a* are secured to the housing to transmit forces relative to the outer housing 210.

A thrust bearing coil 406 is an electromagnet coil that is a wound coil with electronic insulation to take currents from the magnetic bearing controller and convert these to magnetic field in the thrust bearing 218. In some implementations, the thrust bearing coil 406 conductors can be made of copper or a copper alloy.

A thrust bearing stator seal can 412*b* is a ring that covers the electromagnet coil 406 sides and is welded or otherwise sealed to the metal outer and inner poles to prevent process fluids from contacting the electromagnet coil and affecting performance. The cans 412*b* can be metallic, and nonmagnetic, but could also be made of a non-metallic material, such as Peek or ceramic.

A stator pole spacer 414 is a spacer that includes nonmagnetic steel pieces and is used to set the relative position of two stators or a stator and housing to locate the stator poles in relation to the housing 210.

A double stator pole is split in two halves for assembly (a single half is shown in detail in FIG. 4B). These stator poles include two halves that use two coils. The coils wrap 180 degrees on one side and then are routed to the other side where they wrap 180 degrees back and route back to where they started to form a complete loop. This coil winding, along with polarizing the rotor magnets opposite for each subsequent rotor, allows for utilizing the complete coil loop for a split stator pole. As such the two poles are combined for minimum space necessary.

Figure 5:
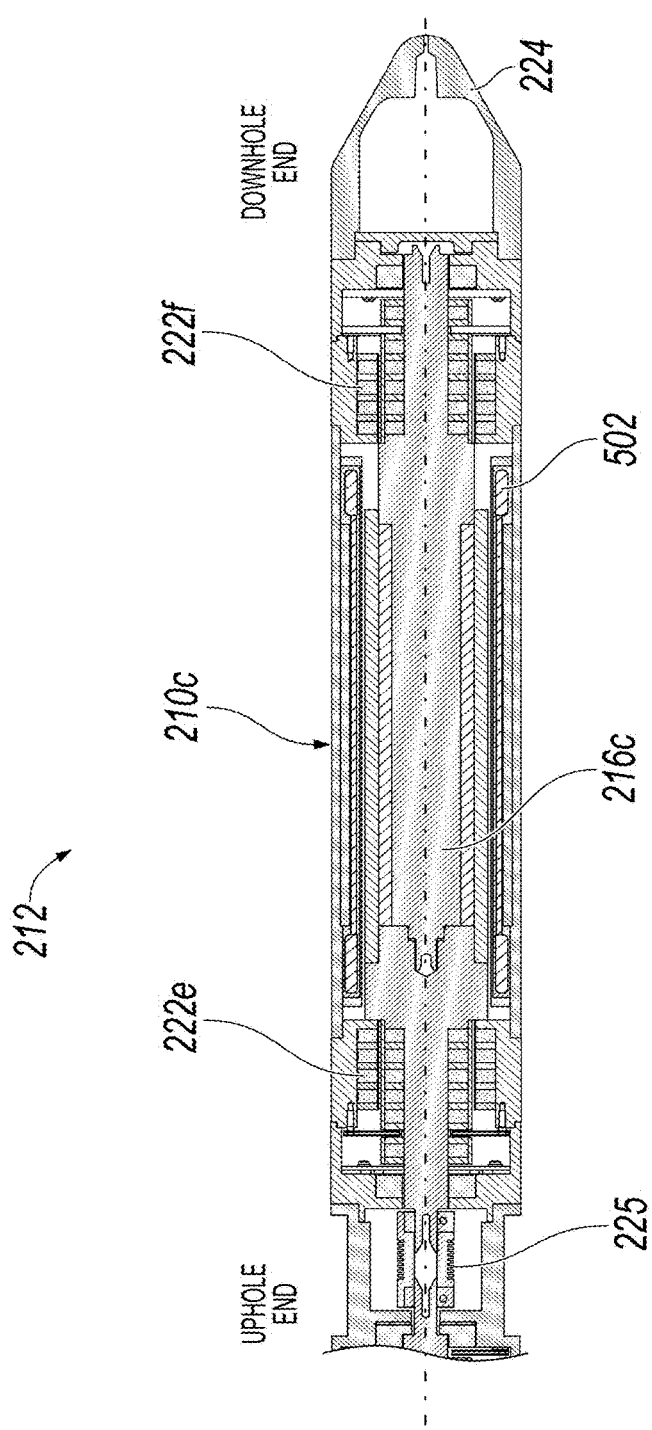
FIG. 5 is a schematic side half cross-sectional view of an example electric machine module.

FIG. 5 is a half cross-sectional schematic diagram of the electric machine 212 that can be used with aspects of this disclosure. In the illustrated implementations, the electric machine 212 is coupled to a downhole end of the thrust bearing module 214 (not shown). The electric machine 212 is configured to either drive or be driven by the fluid rotor 216*a* (not shown) to generate electricity. The electric machine 212 includes a permanent magnet rotor 216*c* that is axially levitated and supported by the thrust bearing module 214. The permanent magnet rotor 216*c* is coupled to the thrust bearing rotor 216*b* by a coupling 225. The coupling 225 can be a bellows, quill, diaphragm, or other coupling type that provides axial stiffness and radial compliance. In certain instances, the coupling 225 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. An electric stator 210*c* surrounds the permanent magnetic rotor 216*c*. The electric stator includes electric coils 502. A fifth passive magnetic radial bearing 222*e* supports and levitates the permanent magnet rotor 216*c* to the electric stator 210*c*. A sixth passive magnetic radial bearing 222*f* supports and levitates the permanent magnet rotor 216*c* to the electric stator 210*c*. As the permanent magnet rotor is axially supported by the thrust bearing module 214, no thrust bearing is needed within the electric machine 212. The stator 210*c* is canned using a metallic or non-metallic sleeve on the inner diameter of the stator 210*c*. The can is sealed, by welding for example, at each end and supported from any well pressure by the stator and/or potting behind the sleeve to insure it does not deform during operation. Multiple electric machines 212 can be connected in series to produce more power if needed.

The electric machine 212 is controlled by a high frequency variable speed drive (VSD) from the surface. Variable frequency or speed allows the electric machine 212 drive to rotate the device at a speed optimal for well production. It also allows for one drive to be used at many well sites where performance in speed and power vary. While sensored drives could be used, bringing sensor signals to the surface over long distances presents many challenges, including cables and connectors in addition to having the actual sensor and their associated electronics installed in the system. The downhole-type artificial lift system 124 uses a sensor-less VSD capable of long distance (>300 meters) electric machine 212 control. This sensor-less VSD monitors the speed of the electric machine 212 and is able to maintain speed or torque control of the electric machine 212 to ensure it operates as desired. The VSD can also be capable of interpreting the machine parameters to provide operating data on motor temperature and fluid properties, such as density, for example.

Cables connect the topside VSD to the downhole electric machine 212, transmitting the low voltage (<600 VAC) or medium voltage (<10,000 VAC) from the VSD to the electric machine 212. For longer distances higher voltage is desired to reduce current losses in the cable and reduce cable size. Reductions in cable size reduce cable cost and cable weight, though require higher class of electrical insulation on the cable.

FIGS. 6A-6B illustrate implementations of a downhole-type artificial lift system 600 where the bearings within the electric machine 212 are wetted with a production fluid 602. FIG. 6A is an implementation with magnetic bearings 604a throughout the system, while FIG. 6B is an implementation with mechanical bearings 604b throughout the system. While the illustrated implementations show either magnetic bearings or mechanical bearings, bearing types can be mixed and matched throughout the downhole-type artificial lift system 600. In instances where magnetic radial bearings 604b are used, the magnetic radial bearings can include either a passive magnetic bearing, an active magnetic bearing, or both. In instances where mechanical bearings 604b are used, the mechanical bearing 604b can include a fluid film bearing, an antifriction bearing, or both.

As illustrated, the downhole-type artificial lift system 600 includes the downhole-type electric machine 212, the thrust bearing module 214, and the fluid-end module 200. In this implementation the thrust bearing module 214, and the fluid-end module 200 each contain seals 621 to protect the bearings from the production fluid 602. The thrust bearing module 214, and the fluid-end module 200 also have their bearings immersed in a barrier fluid 622. The barrier fluid 622 can act as a coolant or lubricant and can help mitigate or prevent contamination of the immersed bearings. The electric machine 212 includes a rotor 606 and an electric stator 608 that surrounds the rotor 606. The rotor 606 can include a permanent magnet rotor, an inductive rotor, or any other type of electric rotor. The stator 608 is configured to cause the rotor 606 to rotate or generate electricity in the electric stator 608 when the rotor 606 rotates. The electric machine 212 includes an electric machine housing 610 where the rotor 606, stator 608, and one or more radial bearings 604 reside within the electric machine housing 610. The electric stator 608 is spaced from the rotor 606 and defines a first annular fluid gap 612 in-between the electric rotor 606 and the electric stator 608 that is in fluid communication with an outside environment 614 exterior the electric machine 212. The electric machine 212 also includes one or more radial bearings 604, such as mechanical radial bearing 604b or magnetic radial bearing 604a. Each radial bearing includes a first portion 618 coupled to the rotor 606 and a second portion 616 coupled to the electric stator 608. The first portion 618 is spaced from the second portion 616 and defines a second annular fluid gap 621 in-between that is in fluid communication with the outside environment 614 exterior the electric machine 212.

In some implementations, electrical components in the electric stator, such as electrical coils 502 shown in FIG. 5, are fluidically isolated from the outside environment 614. Such isolation protects the electrical components from corrosion and other degradation mechanisms that can occur due to exposure to the downhole environment 614.

In some instances, the process fluid 602 is present in the first annular fluid gap 612 and the second annular fluid gap 621. That is, the first annular fluid gap 612 and the second annular fluid gap 621 are exposed to the process fluid 602. In some implementations, the process fluid 602 flows through the first annular fluid gap 612 and the second annular fluid gap 621. That is, the first annular fluid gap 612 and the second annular fluid gap 621 are not simply exposed to the process fluid 602, but the process fluid 602 is actively flowed through the first annular fluid gap 612, the second annular fluid gap 621, or both. Such a process fluid 602 flow allows for cooling of the electric machine 212, including the electric stator 608, the electric rotor 606, and the one or more radial bearings 604. In other words, the first annular fluid gap 612 and the second annular fluid gap 616 are configured to cool the electric stator 608, the electric rotor 606, and the one or more radial bearings 604.

In some instances, the following method can be used in conjunction with one or more implementations described within this disclosure. A working fluid, such as production fluid 602, is flowed through a downhole-type rotating device, such as electric machine 212 positioned in a wellbore. The downhole device can include an electric rotor, such as rotor 606, and an electric stator, such as stator 608. The rotor is supported within the electric stator. The electric stator is spaced from the rotor such that a first annular fluid gap, such as the first fluid gap 612, is defined in-between. The fluid-gap is in fluid communication with an outside environment exterior the downhole-type rotating device. The working fluid is flowed through the annular fluid gap.

In some instances, the electric stator and the electric rotor are cooled in response to flowing the working fluid through the first annular fluid gap. In some instances, the working fluid is flowed through a second annular fluid gap of a radial bearing, such as bearing 604a or bearing 604b, defined by a first bearing portion coupled to the rotor and a second portion coupled to the electric stator with the first portion spaced from the second portion. In such an instance, the radial bearing is cooled in response to flowing the working fluid through the second annular fluid gap.

FIGS. 7A-7B illustrate implementations of a downhole-type artificial lift system 700 where the bearings within the fluid-end 200 are wetted with a production fluid 702. FIG. 7A is an implementation with magnetic bearings 704a throughout the system, while FIG. 7B is an implementation with mechanical bearings 704b throughout the system. While the illustrated implementations show either magnetic bearings or mechanical bearings, bearing types can be mixed and matched throughout the downhole-type artificial lift system 700. In instances where magnetic radial bearings 704b are used, the magnetic radial bearings can include either a passive magnetic bearing, an active magnetic bearing, or both. In instances where mechanical bearings 704b are used, the mechanical bearing 704b can include a fluid film bearing, an antifriction bearing, or both.

As illustrated, the downhole-type artificial lift system 700 includes the downhole-type electric machine 212, the thrust bearing module 214, and the fluid-end module 200. In this implementation the thrust bearing module 214 contains seals 720 to protect the bearings of the thrust bearing module 214 and the electric machine 212 from the production fluid 702. The thrust bearing module 214, and the electric machine 212 also have their bearings immersed in a barrier fluid 722. The barrier fluid 722 can act as a coolant or lubricant and can help mitigate or prevent contamination of the immersed bearings.

The fluid-end 200 includes a rotor 706 and a fluid stator 708 that surrounds the rotor 706. The fluid rotor 706 is configured to move or be rotated by a working fluid. The rotor 706 can be an axial impeller, a radial impeller, a mixed flow impeller, or a combination of impellers. The fluid-end 200 includes a fluid-end housing 710 where the rotor 706, stator 708, and one or more radial bearings 704 reside within the fluid-end housing 710. The fluid stator 708 is spaced from the rotor 706 and defines a first annular fluid gap 712 in-between the fluid rotor 706 and the fluid stator 708 that is in fluid communication with an outside environment 714 exterior the fluid-end 200. The fluid-end 200 also includes one or more radial bearings 704, such as mechanical radial bearing 704b or magnetic radial bearing 704a. Each radial bearing includes a first portion 718 coupled to the rotor 706 and a second portion 716 coupled to the fluid-end housing 710. The first portion 718 is spaced from the second portion 716 and defines a second annular fluid gap 721 in-between that is in fluid communication with the outside environment 714 exterior the fluid-end 200.

In some instances, the process fluid 702 is present in the first annular fluid gap 712 and the second annular fluid gap 721. That is, the first annular fluid gap 712 and the second annular fluid gap 721 are exposed to the process fluid 702. In some implementations, the process fluid 702 flow flows through the first annular fluid gap 712 and the second annular fluid gap 721. That is, the first annular fluid gap 712 and the second annular fluid gap 721 are not simply exposed to the process fluid 702, but the process fluid 702 is actively flowed through the first annular fluid gap 712, the second annular fluid gap 721, or both. Such a process fluid 702 flow allows for cooling of the fluid-end 200, including the fluid stator 708, the rotor 706, and the one or more radial bearings 704. In other words, the first annular fluid gap 712 and the second annular fluid gap 716 are configured to cool the fluid stator 708, the rotor 706, and the one or more radial bearings 704.

In some instances, the following method can be used in conjunction with one or more implementations described within this disclosure. A working fluid, such as production fluid 702, is flowed through a downhole-type rotating device, such as fluid-end 200 positioned in a wellbore. The downhole device can include a fluid rotor, such as rotor 706, and a fluid stator, such as stator 708. The rotor is supported within the stator. The fluid stator is spaced from the rotor such that a first annular fluid gap, such as the first fluid gap 712, is defined in-between. The fluid-gap is in fluid communication with an outside environment exterior the downhole-type rotating device. The working fluid is flowed through the annular fluid gap.

In some instances, the fluid stator and the fluid rotor are cooled in response to flowing the working fluid through the first annular fluid gap. In some instances, the working fluid is flowed through a second annular fluid gap of a radial bearing, such as bearing 704a or bearing 704b, defined by a first bearing portion coupled to the rotor and a second portion coupled to the electric stator with the first portion spaced from the second portion. In such an instance, the radial bearing is cooled in response to flowing the working fluid through the second annular fluid gap.

Figures 8A, 8B:
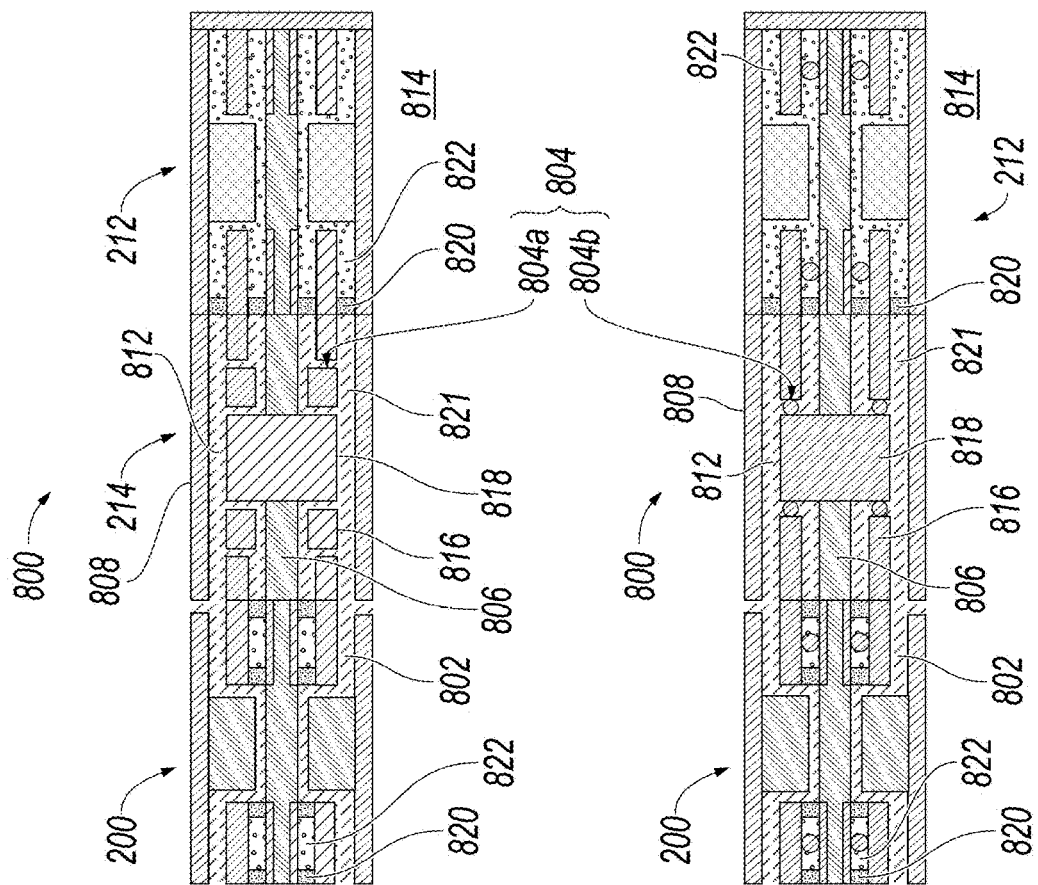
FIGS. 8A-8B are schematic side half cross-sectional views of an example downhole-type artificial lift system

FIGS. 8A-8B illustrate implementations of a downhole-type artificial lift system 800 where the bearings within the thrust bearing module 214 are wetted with a production fluid 802. FIG. 8A is an implementation with magnetic bearings 804a throughout the system, while FIG. 8B is an implementation with mechanical bearings 804b throughout the system. While the illustrated implementations show either magnetic bearings or mechanical bearings, bearing types can be mixed and matched throughout the downhole-type artificial lift system 800. In instances where magnetic radial bearings 804b are used, the magnetic radial bearings can include either a passive magnetic bearing, an active magnetic bearing, or both. In instances where mechanical bearings 804b are used, the mechanical bearing 804b can include a fluid film bearing, an antifriction bearing, or both.

As illustrated, the downhole-type artificial lift system 800 includes the downhole-type electric machine 212, the thrust bearing module 214, and the fluid-end module 200. In this implementation, the electric machine 212 and the fluid-end 200 each contain seals 820 to protect the bearings of the electric machine 212 and the fluid-end 200, respectively, from the production fluid 802. The fluid-end 200, and the electric machine 212 also have their bearings immersed in a barrier fluid 822. The barrier fluid 822 can act as a coolant or lubricant and can help mitigate or prevent contamination of the immersed bearings.

The thrust bearing module 214 includes a rotor 806 and a housing 810 that surrounds the rotor 806. The thrust bearing module housing 810 is where the rotor 806 and one or more thrust bearings 804 reside within the housing 810. In some instances, the housing 810 can be considered a stator. The housing 810 is spaced from the rotor 806 and defines a first annular fluid gap 812 in-between the rotor 806 and the housing 810 that is in fluid communication with an outside environment 814 exterior the thrust bearing module 214. The thrust bearing module 214 also includes one or more thrust bearings 804, such as mechanical thrust bearing 804b or magnetic thrust bearing 804a. Each thrust bearing includes a first portion 818 coupled to the rotor 806 and a second portion 816 coupled to the housing 810. The first portion 818 is spaced from the second portion 816 and defines a second fluid gap 821 in-between that is in fluid communication with the outside environment 814 exterior the thrust bearing module 214.

In some implementations, electrical components in the thrust bearing, such as coil 406 shown in FIG. 4A, are fluidically isolated from the outside environment 814. Such isolation protects the electrical components from corrosion and other degradation mechanisms that can occur due to exposure to the downhole environment 814.

In some instances, the process fluid 802 is present in the first annular fluid gap 812 and the second annular fluid gap 821. That is, the first annular fluid gap 812 and the second annular fluid gap 821 are exposed to the process fluid 802. In some implementations, the process fluid 802 flow flows through the first annular fluid gap 812 and the second fluid gap 821. That is, the first annular fluid gap 812 and the second fluid gap 821 are not simply exposed to the process fluid 802, but the process fluid 802 is actively flowed through the first annular fluid gap 812, the second fluid gap 821, or both. Such a process fluid 802 flow allows for cooling of the thrust bearing module 214, including the housing 810, the rotor 806, and the one or more thrust bearings 804. In other words, the first annular fluid gap 812 and the second fluid gap 816 are configured to cool the housing 810, the rotor 806, and the one or more thrust bearings 804.

In some instances, the following method can be used in conjunction with one or more implementations described within this disclosure. A working fluid, such as production fluid 802, is flowed through a downhole-type rotating device, such as thrust bearing module 214, positioned in a wellbore. The downhole device can include a rotor, such as rotor 806, and a housing, such as housing 810. The rotor is axially supported within the housing. The housing is spaced from the rotor such that a first annular fluid gap, such as the first fluid gap 812, is defined in-between. The fluid-gap is in fluid communication with an outside environment exterior the downhole-type rotating device. The working fluid is flowed through the annular fluid gap.

In some instances, the housing 810 and the rotor 806 are cooled in response to flowing the working fluid through the first annular fluid gap. In some instances, the working fluid is flowed through a second fluid gap of a thrust bearing, such as bearing 804a or bearing 804b, defined by a first bearing portion coupled to the rotor 806 and a second portion coupled to the stator/housing 810 with the first portion spaced from the second portion. In such an instance, the thrust bearing is cooled in response to flowing the working fluid through the second annular fluid gap.

FIGS. 9A-9B illustrate implementations of a downhole-type artificial lift system 900 where the bearings within the electric machine 212 and the bearings within the thrust bearing module 214 are wetted with a production fluid 902. FIG. 9A is an implementation with magnetic bearings 904a throughout the system, while FIG. 9B is an implementation with mechanical bearings 904b throughout the system. While the illustrated implementations show either magnetic bearings or mechanical bearings, bearing types can be mixed and matched throughout the downhole-type artificial lift system 900. In instances where magnetic radial bearings 904a are used, the magnetic radial bearings can include either a passive magnetic bearing, an active magnetic bearing, or both. In instances where mechanical bearings 904b are used, the mechanical bearing 904b can include a fluid film bearing, an antifriction bearing, or both.

As illustrated, the downhole-type artificial lift system 900 includes the downhole-type electric machine 212, the thrust bearing module 214, and the fluid-end module 200. In this implementation, the electric machine 212 is substantially similar to the electric machine 212 described in FIGS. 6A-6B and the thrust bearing module 214 is substantially similar to the thrust bearing module 214 described in FIGS. 8A-8B. The fluid-end 200 contains seals 920 to protect the bearings of the fluid-end 200 from the production fluid 902. The fluid-end 200 has its bearings immersed in a barrier fluid 922. The barrier fluid 922 can act as a coolant or lubricant and can help mitigate or prevent contamination of the immersed bearings.

In some implementations, the process fluid 902 flow flows through the first annular fluid gap 912a and the second fluid gap 920a. That is, the first annular fluid gap 912a and the second fluid gap 920a are not simply exposed to the process fluid 902, but the process fluid 902 is actively flowed through the first annular fluid gap 912a, the second fluid gap 920a, or both. Such a process fluid 902 flow allows for cooling of the electric machine 212, including the stator 908, the rotor 906, and the one or more bearings 904. In other words, the first annular fluid gap 912a and the second fluid gap 920a are configured to cool the stator 908a, the rotor 906a, and the one or more radial bearings 904.

In some implementations, the process fluid 902 flow flows through a third annular fluid gap 912b and the fourth fluid gap 920b within the thrust bearing module 214. That is, the third annular fluid gap 912b and the fourth fluid gap 920b are not simply exposed to the process fluid 902, but the process fluid 902 is actively flowed through the third annular fluid gap 912b, the fourth fluid gap 920b, or both. Such a process fluid 902 flow allows for cooling of the thrust bearing module 214, including the thrust stator 908b, the thrust rotor 906b, and the one or more thrust bearings 905. In other words, the third annular fluid gap 912b and the fourth fluid gap 920b are configured to cool the thrust stator 908b, the thrust rotor 906b, and the one or more thrust bearings 905.

In some implementations, the first annular fluid gap 912a, the second annular fluid gap 920a, the third annular fluid gap 912b, and the fourth fluid gap 920b, are all in fluid communication with one-another. That is, there is a flow path that connects each of the fluid gaps to one another.

Figures 10A, 10B:
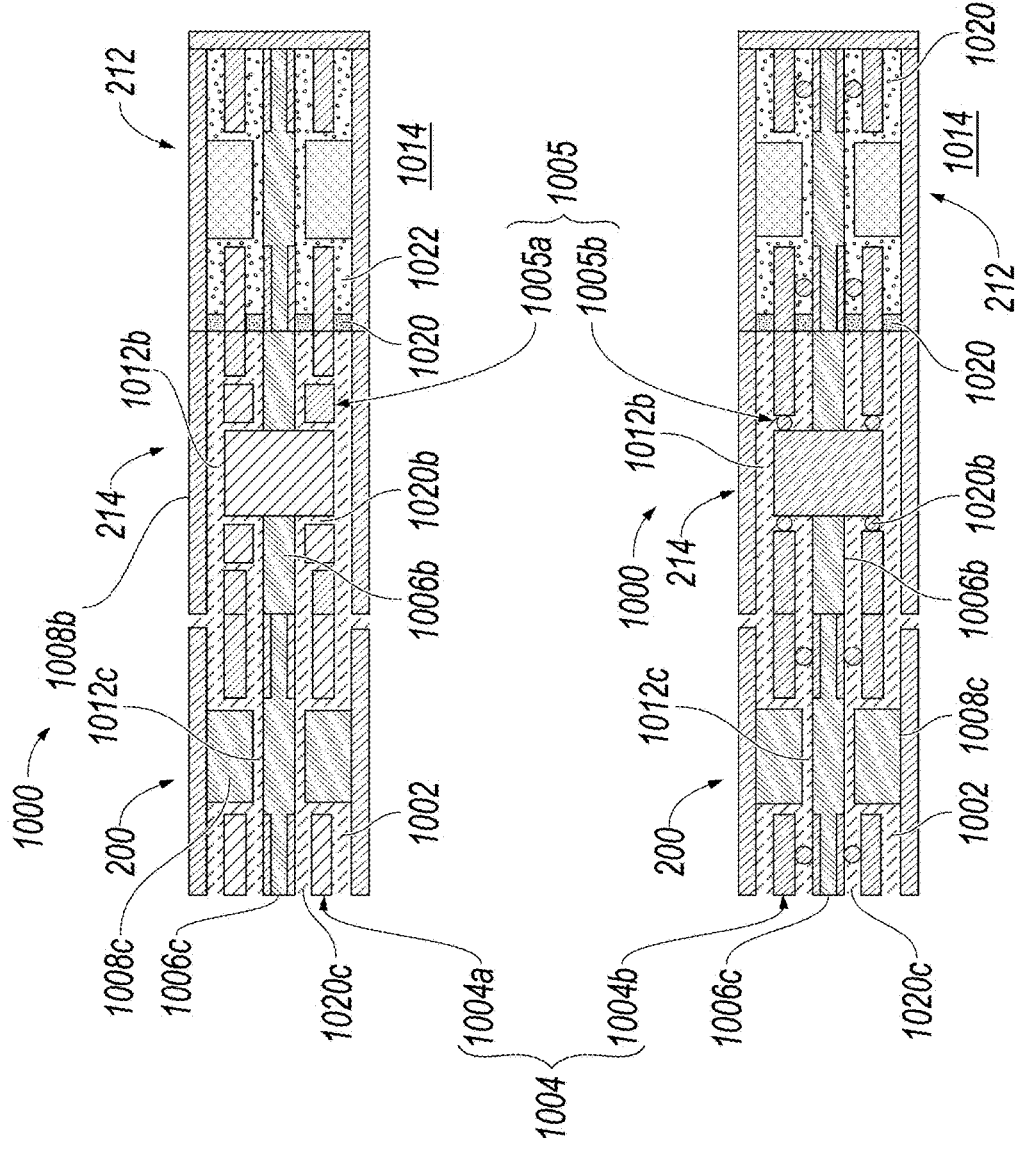
FIGS. 10A-10B are schematic side half cross-sectional views of an example downhole-type artificial lift system.

FIGS. 10A-10B illustrate implementations of a downhole-type artificial lift system 1000 where the bearings within the fluid-end 200 and the bearings within the thrust bearing module 214 are wetted with a production fluid 1002. FIG. 10A is an implementation with magnetic bearings 1004a throughout the system, while FIG. 10B is an implementation with mechanical bearings 1004b throughout the system. While the illustrated implementations show either magnetic bearings or mechanical bearings, bearing types can be mixed and matched throughout the downhole-type artificial lift system 1000. In instances where magnetic radial bearings 1004a are used, the magnetic radial bearings 1004a can include either a passive magnetic bearing, an active magnetic bearing, or both. In instances where mechanical bearings 1004b are used, the mechanical bearing 1007b can include a fluid film bearing, an antifriction bearing, or both.

As illustrated, the downhole-type artificial lift system 1000 includes the downhole-type electric machine 212, the thrust bearing module 214, and the fluid-end module 200. In this implementation, the fluid-end 200 is substantially similar to the fluid-end 200 described in FIGS. 7A-7B and the thrust bearing module 214 is substantially similar to the thrust bearing module 214 described in FIGS. 8A-8B. The electric machine 212 contains seals 1020 to protect the bearings of the electric machine 212 from the production fluid 1002. The fluid-end 200 has its bearings immersed in a barrier fluid 1022. The barrier fluid 1022 can act as a coolant or lubricant and can help mitigate or prevent contamination of the immersed bearings.

In some implementations, the process fluid 1002 flow flows through a fifth annular fluid gap 1012c and the sixth annular fluid gap 1020c. That is, the fifth annular fluid gap 1012c and the sixth annular fluid gap 1020c are not simply exposed to the process fluid 1002, but the process fluid 1002 is actively flowed through the fifth annular fluid gap 1012c, the sixth fluid gap 1020c, or both. Such a process fluid 1002 flow allows for cooling of the fluid-end 200, including the fluid stator 1008, the fluid rotor 1006, and the one or more bearings 1007. In other words, the fifth annular fluid gap 1012c and the sixth annular fluid gap 1020c are configured to cool the stator 1008c, the rotor 1006c, and the one or more radial bearings 1007.

In some implementations, the process fluid 1002 flow flows through a third annular fluid gap 1012b and the fourth fluid gap 1020b within the thrust bearing module 214. That is, the third annular fluid gap 1012b and the fourth fluid gap 1020b are not simply exposed to the process fluid 1002, but the process fluid 1002 is actively flowed through the third annular fluid gap 1012b, the fourth fluid gap 1020b, or both.

Such a process fluid 1002 flow allows for cooling of the thrust bearing module 214, including the thrust stator 1008b, the thrust rotor 1006b, and the one or more thrust bearings 1005. In other words, the third annular fluid gap 1012b and the fourth fluid gap 1020b are configured to cool the thrust stator 1008b, the thrust rotor 1006b, and the one or more thrust bearings 1005.

In some implementations, the third annular fluid gap 1012b, the fourth fluid gap 1020b, the fifth annular fluid gap 1012c, and the sixth annular fluid gap 1020c, are all in fluid communication with one-another. That is, there is a flow path that connects each of the fluid gaps to one another.

FIGS. 11A-11B illustrate implementations of a downhole-type artificial lift system 1100 where the bearings within the fluid-end 200 and the bearings within the thrust electric machine 212 are wetted with a production fluid 1102. FIG. 11A is an implementation with magnetic bearings (for example, 1104a and 1107a) throughout the system, while FIG. 11B is an implementation with mechanical bearings (for example, 1104b and 1107b) throughout the system. While the illustrated implementations show either magnetic bearings or mechanical bearings, bearing types can be mixed and matched throughout the downhole-type artificial lift system 1100. In instances where magnetic radial bearings are used, the magnetic radial bearings can include either a passive magnetic bearing, an active magnetic bearing, or both. In instances where mechanical bearings are used, the mechanical bearing can include a fluid film bearing, an antifriction bearing, or both.

As illustrated, the downhole-type artificial lift system 1100 includes the downhole-type electric machine 212, the thrust bearing module 214, and the fluid-end module 200. In this implementation, the fluid-end 200 is substantially similar to the fluid-end 200 described in FIGS. 7A-7B and the electric machine 212 is substantially similar to the electric machine 212 described in FIGS. 6A-6B. The thrust bearing module 214 contains seals 1120 to protect the bearings of the thrust bearing module 214 from the production fluid 1112. The thrust bearing module 214 has its bearings immersed in a barrier fluid 1122. The barrier fluid 1122 can act as a coolant or lubricant and can help mitigate or prevent contamination of the immersed bearings.

In some implementations, the process fluid 1102 flow flows through a fifth annular fluid gap 1112c and the sixth annular fluid gap 1120c. That is, the fifth annular fluid gap 1112c and the sixth annular fluid gap 1120c are not simply exposed to the process fluid 1102, but the process fluid 1102 is actively flowed through the fifth annular fluid gap 1112c, the sixth fluid gap 1120c, or both. Such a process fluid 1102 flow allows for cooling of the fluid-end 200, including the fluid stator 1108, the fluid rotor 1106, and the one or more bearings 1104. In other words, the fifth annular fluid gap 1112c and the sixth annular fluid gap 1120c are configured to cool the stator 1108c, the rotor 1106c, and the one or more radial bearings 1104.

In some implementations, the process fluid 1102 flow flows through the first annular fluid gap 1112a and the second fluid gap 1120a. That is, the first annular fluid gap 1112a and the second fluid gap 1120a are not simply exposed to the process fluid 1102, but the process fluid 1102 is actively flowed through the first annular fluid gap 1112a, the second fluid gap 1120a, or both. Such a process fluid 1102 flow allows for cooling of the electric machine 212, including the stator 1108, the rotor 1106, and the one or more bearings 1104. In other words, the first annular fluid gap 1112a and the second fluid gap 1120a are configured to cool the stator 1108a, the rotor 1106a, and the one or more radial bearings 1104.

In some implementations, the first annular fluid gap 1112a, the second fluid gap 1120a, the fifth annular fluid gap 1112c, and the sixth annular fluid gap 1120c, are all in fluid communication with one-another. That is, there is a flow path that connects each of the fluid gaps to one another.

FIGS. 12A-12B illustrate implementations of a downhole-type artificial lift system 1200 where the bearings within the fluid-end 200, the bearings within the thrust bearing module 214, and the bearings within the electric machine 212, are wetted with a production fluid 1202. FIG. 12A is an implementation with magnetic bearings (1207a, 1205a, and 1204a) throughout the system while FIG. 12B is an implementation with mechanical bearings (1207b, 1205b, and 1204b) throughout the system. While the illustrated implementations show either magnetic bearings or mechanical bearings, bearing types can be mixed and matched throughout the downhole-type artificial lift system 1200. In instances where magnetic radial bearings (1207a, 1205a, and 1204a) are used, the magnetic radial bearings (1207a, 1205a, and 1204a) can include either a passive magnetic bearing, an active magnetic bearing, or both. In instances where mechanical bearings (1207b, 1205b, and 1204b) are used, the mechanical bearings (1207b, 1205b, and 1204b) can include a fluid film bearing, an antifriction bearing, or both.

As illustrated, the downhole-type artificial lift system 1200 includes the downhole-type electric machine 212, the thrust bearing module 214, and the fluid-end 200. In this implementation, the fluid-end 200 is substantially similar to the fluid-end 200 described in FIGS. 7A-7B, the electric machine 212 is substantially similar to the electric machine 212 described in FIGS. 6A-6B, and the thrust bearing module 214 is substantially similar to the thrust bearing module described in FIGS. 8A-8B. There are no seals in the illustrated implementation. All bearings in the downhole-type artificial lift system 1200 are exposed to the production fluid 1202.

In some implementations, the process fluid 1202 flow flows through the first annular fluid gap 1212a and the second fluid gap 1220a. That is, the first annular fluid gap 1212a and the second fluid gap 1220a are not simply exposed to the process fluid 1202, but the process fluid 1202 is actively flowed through the first annular fluid gap 1212a, the second fluid gap 1220a, or both. Such a process fluid 1202 flow allows for cooling of the electric machine 212, including the stator 1208, the rotor 1206, and the one or more bearings 1207. In other words, the first annular fluid gap 1212a and the second fluid gap 1220a are configured to cool the stator 1208a, the rotor 1206a, and the one or more radial bearings 1207.

In some implementations, the process fluid 1202 flow flows through a third annular fluid gap 1212b and the fourth fluid gap 1220b within the thrust bearing module 214. That is, the third annular fluid gap 1212b and the fourth fluid gap 1220b are not simply exposed to the process fluid 1202, but the process fluid 1202 is actively flowed through the third annular fluid gap 1212b, the fourth fluid gap 1220b, or both. Such a process fluid 1202 flow allows for cooling of the thrust bearing module 214, including the thrust stator 1208b, the thrust rotor 1206b, and the one or more thrust bearings 1205. In other words, the third annular fluid gap 1212b and the fourth fluid gap 1220b are configured to cool the thrust stator 1208b, the thrust rotor 1206b, and the one or more thrust bearings 1205.

In some implementations, the process fluid 1212 flow flows through a fifth annular fluid gap 1212c and the sixth annular fluid gap 1220c. That is, the fifth annular fluid gap 1212c and the sixth annular fluid gap 1220c are not simply exposed to the process fluid 1212, but the process fluid 1212 is actively flowed through the fifth annular fluid gap 1212c, the sixth fluid gap 1220c, or both. Such a process fluid 1212 flow allows for cooling of the fluid-end 200, including the fluid stator 1208, the fluid rotor 1206, and the one or more bearings 1207. In other words, the fifth annular fluid gap 1212c and the sixth annular fluid gap 1220c are configured to cool the stator 1208c, the rotor 1206c, and the one or more radial bearings 1207.

In some implementations, the first annular fluid gap 1212a, the second fluid gap 1220a, the third annular gap 1212b, the fourth annular gap 1220b, the fifth annular fluid gap 1212c, the sixth annular fluid gap 1220c, or any combination are all in fluid communication with one-another. That is, there is a flow path that connects each of the fluid gaps to one another.

While some examples of the subject matter have been disclosed, aspects of this disclosure can describe other implementations. For example, in some implementations, the central shaft rotates at a sub-critical speed below a first harmonic of the central shaft. In some implementations, the central shaft can include a single, continuous shaft. While the illustrated examples included two radial bearings within each module, a single radial bearing at an uphole end of the downhole-type artificial lift system and at a downhole end of the downhole-type artificial lift system (two total radial bearings) to provide adequate levitation and support. Active and/or passive damping systems can be used on the passive magnetic radial bearings, the active magnetic thrust bearings, or both. In instances where a passive damping system is used, a highly electrically conductive metal plate, such as a copper plate, can be used. In such an instance, the movement of the rotor generates eddy currents on a copper plate. The eddy currents in turn generate a magnetic field that opposed the field in the rotor, resulting in a force applied to the rotor opposite that of the motion, reducing the motion. The faster and larger the motion, the larger the force generated on the plate in response to the motion. While a permanent magnet rotor was described in the context of the electric machine, an inductive rotor, can be used to similar effect.

The techniques described here can be implemented to yield a construction that is simple, inexpensive, and physically robust. The system can be deployed without special hydraulic or electrical requirements and can be easily retrievable with minimum or no risk of being stuck in the wellbore. The concepts described herein with respect to a blower could also be applied to a compressor, having a higher pressure ratio and lower throughput, a pump, or a multiphase system where the fluid is a combination of liquid and gas. While this disclosure has been described in the context of production applications, it can also be used in injection applications. For example, the described systems can be used to inject fluid into a reservoir to maintain a production pressure on the reservoir.

A number of implementations have been described. Nevertheless, it will be understood that various modifications may be made. Accordingly, other implementations are within the scope of the following claims.

What is claimed is:

1. A downhole-type machine comprising:
    a thrust rotor;
    a thrust stator surrounding the thrust rotor;
    an electric rotor; an electric stator surrounding the rotor and configured to cause the rotor to rotate or generate electricity in the electric stator when the rotor rotates, the electric stator spaced from the rotor and defining a first annular fluid gap in-between that is in fluid communication with an outside environment exterior the electric machine; a fluid rotor rotably coupled to the electric rotor; a fluid stator surrounding the fluid rotor;
    a radial bearing comprising a first radial bearing portion coupled to the thrust rotor and a second radial bearing portion coupled to the thrust stator; and
    a magnetic thrust-bearing comprising a first portion coupled to the thrust rotor, the first portion spaced from a second portion coupled to the thrust stator defining a first annular fluid gap in-between that is in fluid communication with an outside environment exterior the downhole-type machine, the magnetic thrust-bearing configured to support an axial load of the rotor within the stator.

2. The downhole-type machine of claim 1, wherein the magnetic thrust-bearing comprises an active magnetic thrust-bearing.

3. The downhole-type machine of claim 1, wherein the radial bearing comprises a magnetic radial bearing.

4. The downhole-type machine of claim 3, wherein the magnetic radial bearing comprises an active radial bearing.

5. The downhole-type machine of claim 1, comprising a thrust bearing housing and where the rotor, stator and thrust bearing reside within the thrust bearing housing.

6. The downhole-type machine of claim 5, wherein electrical components in the thrust bearing housing are fluidically isolated from the outside environment.

7. The downhole-type machine of claim 1, wherein the machine is configured to permit passage of a well production fluid through the first annular fluid gap.

8. The downhole-type machine of claim 1, wherein the annular fluid gap is configured to permit fluid flow to cool the thrust-bearing.

9. The downhole-type machine of claim 1, wherein the annular fluid gap is configured to allow passage of particles suspended in a fluid of the outside environment.

10. The downhole-type machine of claim 1, where the annular fluid gap is configured to allow passage of 1 mm particles in a fluid.

11. The downhole-type machine of claim 1, where the annular fluid gap is configured to allow passage of 4 mm particles in a fluid.

12. A downhole-type artificial lift system comprising:
    a fluid-end module comprising:
        a fluid rotor configured to drive a production fluid uphole; and
        a fluid stator surrounding the fluid rotor;
    an electric machine module rotatably coupled to the fluid-end module, the electric machine module comprising:
        an electric rotor coupled to the fluid rotor, the electric rotor configured to impart or receive rotational motion from the fluid rotor;
        an electric stator surrounding the electric rotor and configured to cause the electric rotor to rotate in the electric stator when the electric rotor rotates; and
        a radial bearing comprising a first portion coupled to the electric rotor and a second portion coupled to the electric stator; and
    a magnetic thrust bearing module comprising:
        a magnetic thrust bearing stator; and a magnetic thrust bearing configured to axially support the fluid rotor and the electric rotor, the magnetic thrust bearing stator spaced from the magnetic thrust bearing and defining a first annular fluid gap in-between that is in fluid communication with an outside environment exterior the downhole-type artificial lift system.

13. The downhole-type artificial lift system of claim 12, wherein the fluid stator is spaced from the fluid rotor and defining a second annular fluid gap in-between that is in fluid communication with an outside environment exterior the downhole-type artificial lift system, the fluid-end module further comprising a second radial magnetic bearing comprising a third portion coupled to the fluid rotor and a fourth portion coupled to the fluid stator, the third portion spaced from the fourth portion defining a third annular fluid gap in-between that is in fluid communication with the outside environment exterior the downhole-type artificial lift system.

14. The downhole-type artificial lift system of claim 13, wherein the second annular fluid gap is in fluid communication with the first annular fluid gap.

15. The downhole-type artificial lift system of claim 12, wherein the electric stator is spaced from the electric rotor and defining a second annular fluid gap in-between that is in fluid communication with an outside environment exterior the downhole-type artificial lift system, the radial bearing of the electric machine module comprising a first portion coupled to the electric rotor and a second portion coupled to the electric stator, the first portion spaced from the second portion defining a third annular fluid gap in-between that is in fluid communication with the outside environment exterior the downhole-type artificial lift system.

16. The downhole-type artificial lift system of claim 15, wherein the fluid stator is spaced from the fluid rotor and defining a fourth annular fluid gap in-between that is in fluid communication with an outside environment exterior the downhole-type artificial lift system, the fluid-end module further comprising a radial magnetic bearing comprising a fifth portion coupled to the fluid rotor and a sixth portion coupled to the fluid stator, the fifth portion spaced from the sixth portion defining a fifth annular fluid gap in-between that is in fluid communication with the outside environment exterior the downhole-type artificial lift system.

17. The downhole-type artificial lift system of claim 16, wherein the fourth annular fluid gap is in fluid communication with the first annular fluid gap and the second annular fluid gap.

18. The downhole-type artificial lift system of claim 12, wherein the fluid rotor is also configured to be driven by the production fluid, wherein rotating the electric rotor generates electricity within the electric stator.

19. A method comprising:
    flowing a well production fluid through a downhole-type rotating device positioned in a production wellbore, the downhole-type rotating device comprising a rotor and a stator;
    axially supporting the rotor within the stator with a magnetic thrust bearing, the stator spaced from the rotor and defining a first annular fluid gap in-between that is in fluid communication with an outside environment exterior the device;
    flowing the well production fluid through the annular fluid gap; and
    flowing the production fluid through a second annular fluid gap of a magnetic radial bearing defined by a first bearing portion coupled to the thrust rotor and a second bearing portion coupled to the thrust stator, the first bearing portion spaced from the second bearing portion.

20. The method of claim 19, further comprising cooling the rotor and the stator in response to flowing the production fluid through the first annular fluid gap.

21. The method of claim 19, wherein the downhole-type rotating device comprises an uphole end, with a coupling configured to connect to a wireline or tubing, and a conical-tipped downhole end, wherein flowing the production fluid through the downhole-type rotating device comprises driving the production fluid from the downhole end to the uphole end.

* * * * *